(12) United States Patent
Nakamura et al.

(10) Patent No.: US 6,674,415 B2
(45) Date of Patent: Jan. 6, 2004

(54) IMAGE DISPLAY DEVICE

(75) Inventors: Tomoyuki Nakamura, Hachioji (JP); Susumu Kobayashi, Sayama (JP); Akihiro Kubota, Kokubunji (JP); Hiroyoshi Kobayashi, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 307 days.

(21) Appl. No.: 09/809,140

(22) Filed: Mar. 15, 2001

(65) Prior Publication Data

US 2001/0024326 A1 Sep. 27, 2001

(30) Foreign Application Priority Data

Mar. 16, 2000 (JP) ......................................... 2000-074518

(51) Int. Cl.[7] ................................................ G09G 3/30
(52) U.S. Cl. .............................. 345/32; 345/30; 345/31; 345/84; 345/87; 348/750; 348/751; 359/443; 359/446; 353/30; 353/31
(58) Field of Search ............................... 345/1.1–1.3, 9, 345/32, 37, 48, 75.2, 76–77, 81, 83, 204–207, 693, 214–215; 348/744–747, 749–751, 756; 359/443, 446, 453, 456, 460; 353/30, 31, 33, 34, 69, 70, 73, 77, 99, 107

(56) References Cited

U.S. PATENT DOCUMENTS

| | | | | |
|---|---|---|---|---|
| 5,300,942 A | * | 4/1994 | Dolgoff ........................ | 345/32 |
| 5,418,546 A | * | 5/1995 | Nakagakiuchi et al. ........ | 345/85 |
| 5,617,243 A | * | 4/1997 | Yamazaki et al. ............ | 359/309 |
| 5,874,929 A | * | 2/1999 | Opower et al. ................ | 345/32 |
| 6,072,459 A | * | 6/2000 | Asakawa et al. ............. | 345/101 |
| 6,215,481 B1 | * | 4/2001 | Tanijiri et al. ............... | 345/207 |
| 6,480,175 B1 | * | 11/2002 | Schneider .................... | 345/32 |

FOREIGN PATENT DOCUMENTS

| | | |
|---|---|---|
| JP | 5-292439 | 11/1993 |
| JP | 278870 | 6/1998 |
| JP | 2796684 | 7/1998 |

* cited by examiner

*Primary Examiner*—Richard Hjerpe
*Assistant Examiner*—Henry N. Tran
(74) *Attorney, Agent, or Firm*—Frishauf, Holtz, Goodman & Chick, P.C.

(57) ABSTRACT

Three lines' worth of an image are displayed on a columnar display unit 11 comprising a plurality (for example, three) of one-dimensional display devices; this image light beam is made incident on perpendicular deflection means 14, and using the perpendicular deflection means 14, this image light beam is deflected and scanned at high speed in directions perpendicular to the longitudinal direction of the columnar display unit 11 to obtain a two-dimensional image. A plurality of one-dimensional display devices is used, so that compared with conventional devices in which only a single one-dimensional display device is used, even if the rewrite speed (scanning speed) per one-dimensional display device is slow, good image quality free of flicker can be obtained. By further extending this in a configuration using a plurality of columnar display units, a single image can be divided into a plurality of images and displayed in a row on a screen. In order to prevent seams in this juxtaposed display of a plurality of images from being conspicuous, when overlapping parts are provided in the scanned range of the plurality of images, a correction image capture member 47, correction computation member 48, and correction processing member 49 can be used to correct the brightness of the overlapping parts, enabling display of a single high-resolution, large-screen image.

19 Claims, 16 Drawing Sheets

ENTIRE COLUMN
SAME COLOR

RGB CONTAINED
IN COLUMNS

BAYER PATTERN

SCANNING BEGUN FROM
BOTH EDGES,
CROSSING TO OPPOSITE EDGES

SCANNING AT SAME
VELOCITY
IN SAME DIRECTION

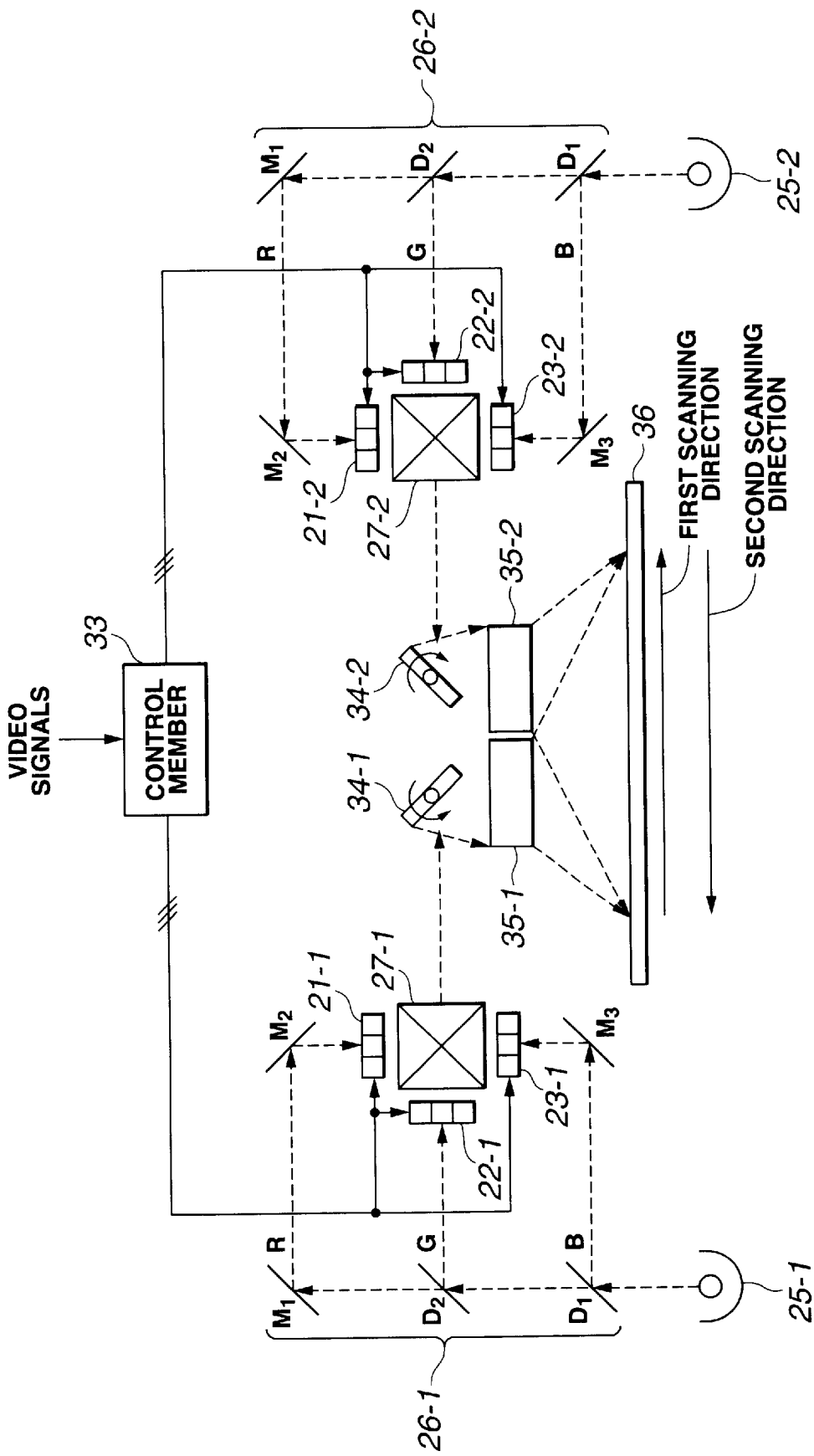

DISPLAY SCREEN

BRIGHTNESS CORRECTION SIGNAL

DISPLAY SCREEN WITH OVERLAPPING PART

FIRST IMAGE DISPLAY RANGE

SECOND IMAGE DISPLAY RANGE

OVERLAPPING PART (BRIGHT)

FIRST SCANNING DIRECTION    SECOND SCANNING DIRECTION

GEOMETRIC DISTORTION

IMAGE DISPLAY POSITION SHIFT

IMAGE DISPLAY DEVICE

This application claims benefit of Japanese Application No. 2000-074518 filed in Japan on Mar. 16, 2000, the contents of which are incorporated by this reference.

BACKGROUND OF THE INVENTION

1. Field of the Invention

This invention concerns an image display device, and relates to a projection-type image display device, configured using a one-dimensional display device, or a plurality of same combined as a unit.

2. Description of the Related Art

Among conventional projection-type image display devices which enlarge and project an image on a screen are projection-type display using cathode ray tubes. Also, in recent years, liquid crystal projection-type displays have been developed which use liquid crystal panels as light valves. In such conventional liquid crystal projection-type displays, a video signal is reproduced on a liquid crystal panel which executes two-dimensional display, and light from a light source is modulated by the two-dimensional image reproduced on the above liquid crystal panel; this image is enlarged and projected onto a screen by an optical system.

On the other hand, there is a technique, such as described for example in Japanese Patent Laid-open No. H5-292439, in which light irradiated from a light source is modulated by one-dimensional optical modulation means in which liquid crystal pixels or similar are arranged in a single column shape, and by scanning this one-dimensional modulated light in directions perpendicular to the column direction using a polygon mirror or other perpendicular deflection means, a single two-dimensional image is displayed. Other techniques use laser light as the light source, as for example in Japanese Patent Publications No. 2788770 and 2796684.

However, in the above methods extremely high speeds are required for rewriting of the one-dimensional optical modulation means, in proportion to the number of pixels in the displayed image, in order to display high-resolution, large-screen images. Hence the difficulty in displaying flicker-free high-resolution, large-screen images poses a problem.

Also, when displaying a two-dimensional image which is long in the horizontal direction, the distance from the perpendicular deflection means to the screen is increased, and the overall device becomes large. Or, the perpendicular deflection means must provide larger deflection angles, and the number of polygon mirror faces is reduced, so that the scanning speed per frame is reduced, giving rise to such problems as the occurrence of flicker and darker image display.

SUMMARY OF THE INVENTION

One object of this invention is to provide an image display device capable of the flicker-free display of high-resolution, large-screen images.

An image display device, of the present invention, for displaying images on a screen, comprises a columnar display unit, comprising a plurality of means, arranged in parallel, which emit one-dimensional images; a control member which applies image signals to said columnar display unit; a perpendicular deflection means, which deflects light emitted from said columnar display unit in directions perpendicular to the column direction, and scans said screen; and, an image-forming optical system which forms an image, from said perpendicular deflection means, on said screen, according to the change in the distance from said columnar display unit to said screen.

Further, an image display device, of the present invention, for displaying images on a screen, comprises a plurality of columnar display units, in which a plurality of means, which emit one-dimensional color images, are arranged in parallel to form one columnar display unit; a control member which applies image signals to each of said columnar display units; at least one perpendicular deflection means which deflects light emitted from each of said columnar display units in directions perpendicular to the column direction, and which scans said screen; and, a plurality of image-forming optical systems which form an image, from said perpendicular deflection means, on said screen, according to the change in the distance from each of said columnar display units to said screen.

BRIEF DESCRIPTION OF THE DRAWINGS

FIG. 9 is a diagram showing in summary the configuration of the image display device of a sixth aspect of this invention, seen from above;

DESCRIPTION OF THE PREFERRED EMBODIMENTS

Figure 1:
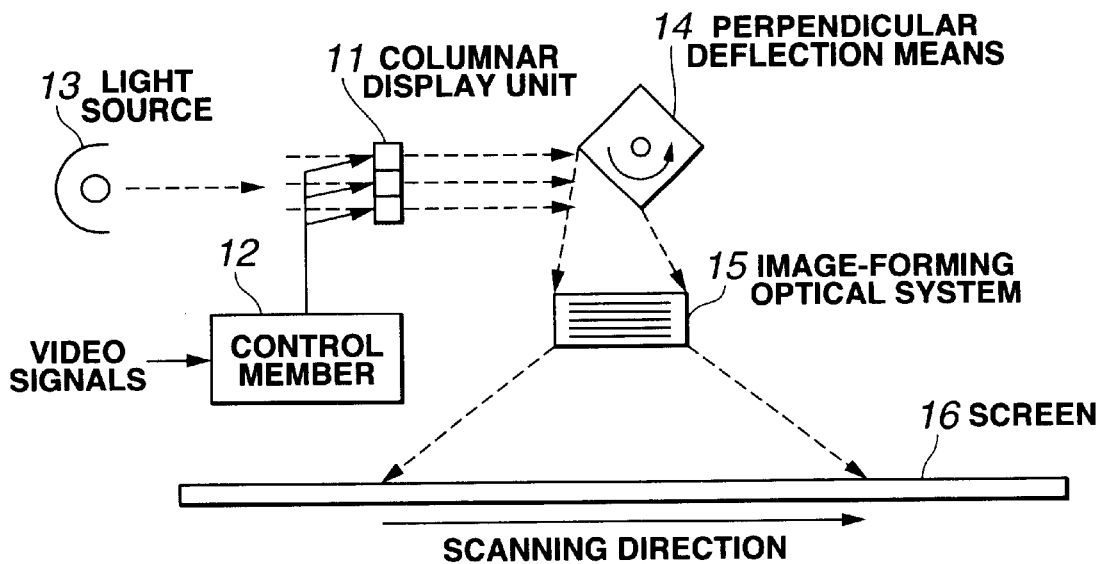
FIG. 1 is a diagram showing in summary the configuration of the image display device of a first aspect of this invention, seen from above.

Below aspects of this invention are explained, referring to the drawings.

First Aspect of the Invention

FIG. 1 shows in summary the configuration of the image display device of a first aspect of this invention, seen from above. The image display device has a columnar display unit 11, a control member 12, a light source 13, perpendicular deflection means 14, an image-forming optical system 15, and a screen 16.

Figure 2A:
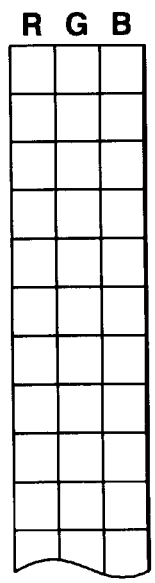
FIG. 2A, FIG. 2B, and FIG. 2C are diagrams showing examples of configurations of the columnar display unit of FIG. 1.
Figure 2B:
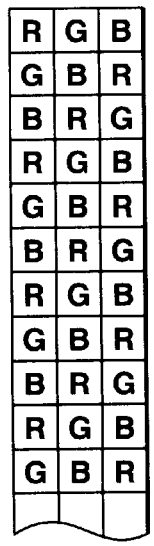
Figure 2C:
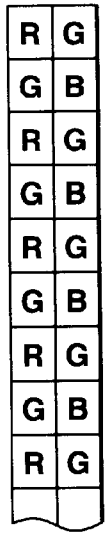

The columnar display unit 11 comprises a plurality of one-dimensional optical modulation means, arranged in parallel; for example, it may comprise a plurality (for example, two or three) of vertical-direction one-dimensional liquid crystal devices, having only pixels equal to the number of pixels in the vertical direction, and arranged in parallel. For example, as shown in FIG. 2A, one one-dimensional display device is used for each of the primary colors R (red), G (green) and B (blue), and one unit comprises three one-dimensional display devices; by means of the control member 12 described below, the columnar display unit 11 may be scanned in the order R columns, G columns, B columns, or three columns may be scanned simultaneously. Or, as shown in FIG. 2B, pixels of different colors may be arranged in order, for example R, G, B, R, G, B, . . . , so that a single one-dimensional display device has functions enabling three-color display. Or, as shown in FIG. 2C, a Bayer pattern which fills two columns with R, G, B may be used. Several columns may be comprised in one unit; there is no limit in particular on the number of devices.

Interlaced or non-interlaced analog video signals are input to the control member 12, which generates video signals appropriate for the above columnar display unit 11. That is, the control member 12 applies the input video signal to the columnar display unit 11, in amounts corresponding to the number of one-dimensional display devices, with appropriate timing. On the one-dimensional display devices, one line's worth of pixels of the video signal are displayed so as to conform to the pixel pattern, and the displayed content is rewritten according to the scanning speed of the perpendicular deflection means 14.

The light source 13 generates white light containing three primary color components or monochromatic light, and irradiates the above columnar display unit 11.

Light modulated by the image displayed by the above columnar display unit 11 is incident on the perpendicular deflection means 14, which, by rotating in a direction perpendicular to the column direction, deflects and scans the light. The perpendicular deflection means 14 may be a polygon mirror (rotating multi-faced mirror), a galvano-mirror (flat-face mirror), or some other device capable of rapid, stable scanning. A polygon mirror may have any number of faces. The scanning speed need not be uniform. Some distortion occurs in the peripheral parts of the image; the speed can be changed to correct for this. If constant-speed scanning is performed, pixels will be more dense at positions on the screen 16 close to the display device, and will be more sparse in more distant parts. By reducing the scanning rate for more distant parts, it is possible to obtain a uniform pixel density for the entire image on the screen 16. The scanning direction on the screen 16 may be from top to bottom, or from bottom to top, from right to left, from left to right, or from right to left and then left to right.

The image-forming optical system 15 comprises a plurality of optical lenses in combination; in order to produce an image free of defocusing on the screen 16, the optical system is designed such that the focus is on the screen 16 even when the optical path distance from the columnar display unit 11 to the screen 16 changes. The image-forming optical system 15 of this aspect cancels both defocusing due to differences in the distance to the screen 16 with the optical beam scanning position due to the perpendicular deflection means 14, and defocusing due to differences in the projection distance to the screen 16 among a plurality of lines (plurality of lines comprised by the columnar display unit).

The screen 16 is for formation of the image displayed on the columnar display unit 11; an image projected via the image-forming optical system 15 is displayed as a two-dimensional image of one field or one frame.

Next, the action of FIG. 1 is explained, referring to FIG. 3.

Figure 3G:
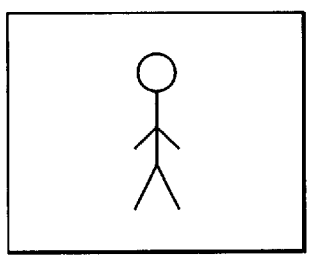
FIG. 3A, FIG. 3B, FIG. 3C, FIG. 3D, FIG. 3E, FIG. 3F, and FIG. 3G are diagrams which explain display operation in the device of FIG. 1.
Figures 3A, 3B, 3C:
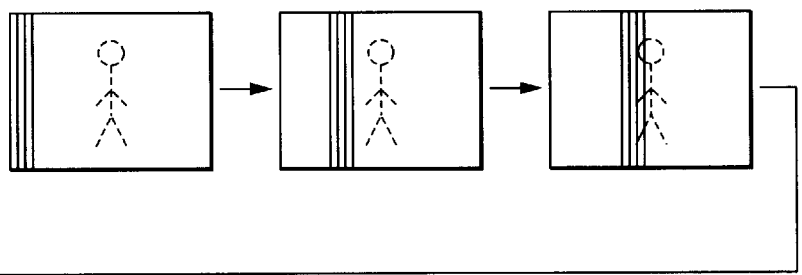
Figures 3D, 3E, 3F:
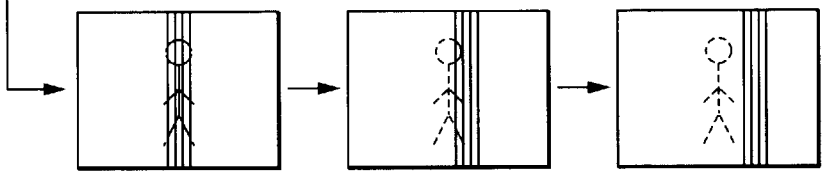

FIGS. 3A through 3F show a state in which three image light beams are scanned rapidly over the back of the screen 16, by deflection scanning of the three vertical-direction image light beams from the columnar display unit 11 in the direction perpendicular to the column direction by means of the perpendicular deflection means 14. FIG. 3G shows the image of a human being observed as a result of the persistence of vision effect in the user's eye, resulting from the high-speed scanning of FIG. 3A through FIG. 3F. In the scanning positions of FIGS. 3A, 3B and 3F, the image of a human is not displayed on the screen 16; in each of the scanning positions of FIGS. 3C, 3D and 3E, part of the image of a human is displayed in succession.

In the aspect of FIG. 1, a two-dimensional image is displayed sequentially several lines at a time (in the figure, three lines) equal to the number of one-dimensional display devices in the columnar display unit 11. By irradiating the columnar display unit 11 with the light source 13, several lines' worth of image light beams, modulated by the columnar display unit 11, are deflected and scanned in the direction perpendicular to the longitudinal direction of the columnar display unit 11 by the perpendicular deflection means 14, pass through the image-forming optical system 15, are corrected for defocusing caused by changes in the projection distance, and form several lines' worth of an image on the screen 16. Through rewriting of the image of the columnar display unit 11 and high-speed deflection by the perpendicular deflection means 14, a one-field or one-frame two-dimensional image can be displayed. That is, by means of high-speed scanning by the perpendicular deflection means 14, the persistence-of-vision phenomenon of the human eye causes several lines of an image to appear to be a single two-dimensional image. Further, if high-speed display of a two-dimensional image is possible, video display can also be performed.

In this aspect, a columnar display unit is used in which plurality of one-dimensional display devices, which are one-dimensional modulation means, are combined as a single unit. Hence a satisfactory image free of flicker can be obtained even if the scanning speed per column is slower than when using a single one-dimensional display device, as in the prior art. That is, one-dimensional display devices with slow rewrite speeds can be used.

Moreover, a configuration may be adopted in which a mirror is placed in the optical path to cause bending-back of the optical path.

Second Aspect of the Invention

Figure 4:
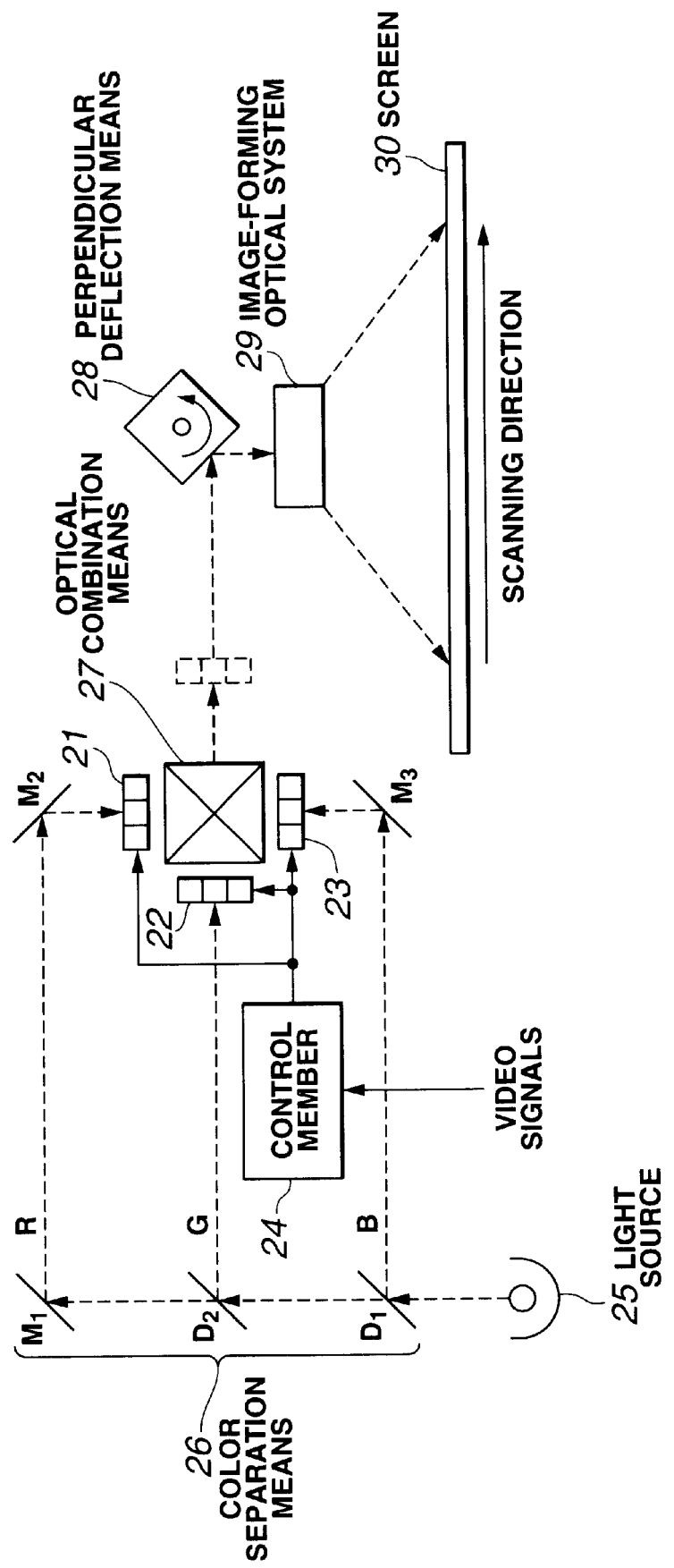
FIG. 4 is a diagram showing in summary the configuration of the image display device of a second aspect of this invention, seen from above.

FIG. 4 shows in summary the configuration of the image display device of a second aspect of this invention, seen from above. The image display device has a first, a second, and a third columnar display unit, 21, 22, 23; a control member 24; a light source 25; color-separation means 26; optical combination means 27; perpendicular deflection means 28; an image-forming optical system 29; and a screen 30.

The first, second, and third columnar display units 21, 22, 23 each comprise a plurality (in the figure, three) of one-dimensional display devices for each of the R, G, B colors. Each of the one-dimensional display devices comprised by each of the columnar display units does not have a color filter. That is, the first columnar display unit 21 has a plurality of one-dimensional optical modulation means, arranged in parallel, to modulate light of a first color, for example red. Similarly, the second columnar display unit 22 has a plurality of one-dimensional optical modulation means, arranged in parallel, to modulate light of a second color, for example green. The third columnar display unit 23 has a plurality of one-dimensional optical modulation means, arranged in parallel, to modulate light of a third color, for example blue. As in the first aspect of this invention, the one-dimensional modulation means may for example consist of a one-dimensional liquid crystal display device, having only pixels equal to the number of pixels in the vertical direction.

Interlaced or non-interlaced analog video signals are input to the control member 24, which applies R, G, B video signals to the first, second, and third columnar display units 21, 22, 23, respectively.

The light source 25 emits white light containing the first, second, and third color components, that is, the three primary color components, to irradiate the columnar display units.

The color separation means 26 comprises, for example, a mirror M1 and dichroic mirrors D1, D2, and separates white light emitted from the light source 25 into each of the first, second and third color components, that is, red, green, and blue light. At the dichroic mirror D1, blue light is reflected from the white light and is supplied to the mirror M3, and thereafter is incident on the third columnar display unit 23. At the dichroic mirror D2, green light is reflected from the light transmitted at the mirror D1, and is incident on the second columnar display unit 22. At the mirror M1, the red light transmitted at the mirror D2 is reflected and supplied to the mirror M2, and thereafter is incident on the first columnar display unit 21. In this way, light of each color from the color separation means 26 is incident on the first, second, and third columnar display units 21, 22, 23, and is optically modulated.

The optical combination means 27 comprises, for example, a dichroic prism, and combines light of three colors leaving each of the first, second, and third columnar display units 21, 22, 23. Here the light of three colors is combined such that there are no shifts in position. The three blocks drawn with broken lines on the output side of the optical combination means 27 indicate that a plurality (in this figure, three) of one-dimensional display image light beams for each of the R, G, B colors has been combined.

The perpendicular deflection means 28 comprises, for example, a four-sided polygon mirror (rotating multi-faced mirror), and deflects the columnar light combined by the optical combination means 27 in directions perpendicular to the column direction.

The image-forming optical system 29 is configured by combining a plurality of optical lenses, and produces, on the screen 30, an image free of defocusing, by focusing on the screen 30 even when the optical path distance from the optical combination means 27 to the screen 30 changes.

The screen 30 causes formation of the image synthesized by the optical combination means 27, to display a one-field or one-frame two-dimensional image projected via the image-forming optical system 29.

In this second aspect, a configuration is shown which employs color separation means 26 in addition to a light source 25; however, a configuration may also be used in which light sources are provided for each primary color and the color separation means 26 is eliminated. In the above aspect, the display devices comprised by each of the first, second, and third columnar display units do not have color filters; but by employing a configuration in which each of the first, second and third columnar display units have color filters for each color, color separation means 26 to separate light from the light source 25 into the three primary color components can be made unnecessary.

Next, the action of FIG. 4 is explained.

In the aspect of FIG. 4, each color of a two-dimensional image is displayed sequentially several lines at a time, equal to the number of one-dimensional display devices of the first, second, and third columnar display units 21 to 23; light emitted from the light source 25 is separated into first, second and third colors by the color separation means 26, to irradiate the respective corresponding columnar display units 21 to 23. Several lines' worth of modulated image light beams are emitted from each of the columnar display units 21 to 23, and these are combined into one by the optical combination means 27. The combined image light beams are deflected in the direction perpendicular to the longitudinal direction of the columnar display units 21 to 23 by the perpendicular deflection means 28, pass through an image-forming optical system 29, defocusing caused by changes in the projection distance are corrected, and several lines' worth of image light beams are displayed on the screen 30. Through high-speed execution of rewriting of the images of the columnar display units 21 to 23 and of deflection by the perpendicular deflection means 28, a two-dimensional image can be displayed. By this means, a two-dimensional image of higher resolution than that described in the first aspect of FIG. 1 is displayed in color.

In this second aspect also, similarly to the first aspect, columnar display units are employed in which a plurality of one-dimensional modulation means are used as one unit, so that a satisfactory image free of flicker can be obtained even if the scanning speed per column is slower than when using a single one-dimensional modulation means, as in the prior art. That is, one-dimensional display devices with slow rewrite speeds can be used.

In the above-described first and second aspects, transmissive display devices are used as columnar display units; but by configuring columnar display units from display devices which themselves emit light, a light source can be made unnecessary. Next, a third and fourth aspect, in which a light source is unnecessary, are explained.

Third Aspect of the Invention

Figure 5:
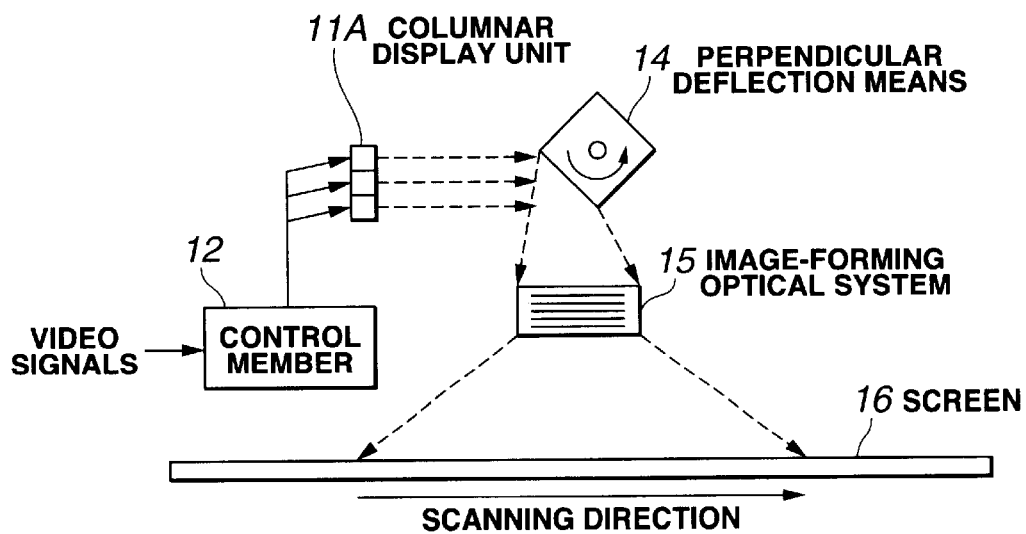
FIG. 5 is a diagram showing in summary the configuration of the image display device of a third aspect of this invention, seen from above.

FIG. 5 shows in summary the configuration of the image display device of a third aspect of this invention, seen from above. Members which are the same as in FIG. 1 are assigned the same symbols for explanations.

In FIG. 5, a difference with FIG. 1 is the use of an array of LEDs, lasers, or other emissive elements as each of the one-dimensional display devices, a plurality of which are comprised by the columnar display unit 11A. As a result, the light source 13 in FIG. 1 becomes unnecessary. Hence the image display device comprises a columnar display unit 11A, a control member 12, perpendicular deflection means 14, an image-forming optical system 15, and a screen 16. The columnar display unit 11A comprises a plurality (in the figure, two or three) of one-dimensional emissive arrays, arranged in parallel, corresponding to a plurality of colors (in the figure, the three colors R, G, B) as in FIG. 2A through FIG. 2C. Otherwise the configuration is similar to that of FIG. 1. By this means, the configuration can be simplified.

Next, the action of FIG. 5 is explained.

In the aspect of FIG. 5 also, in the columnar display unit 11A a two-dimensional image is displayed sequentially a plurality of lines' worth of one-dimensional display devices at a time, based on the three R, G, B primary-color signals supplied by the control member 12, so that several lines' worth of modulated image light beams are emitted. The emitted several lines' worth of image light beams are deflected in directions perpendicular to the longitudinal direction of the columnar display unit 11A by the perpendicular deflection means 14, and pass through the image-forming optical system 15. Defocusing caused by changes in the projection distance is corrected, and several lines' worth of an image is formed on the screen 16. Through high-speed execution of rewriting of the images of the columnar display unit 11A and of deflection by the perpendicular deflection means 14, a two-dimensional image can be displayed.

Fourth Aspect of the Invention

Figure 6:
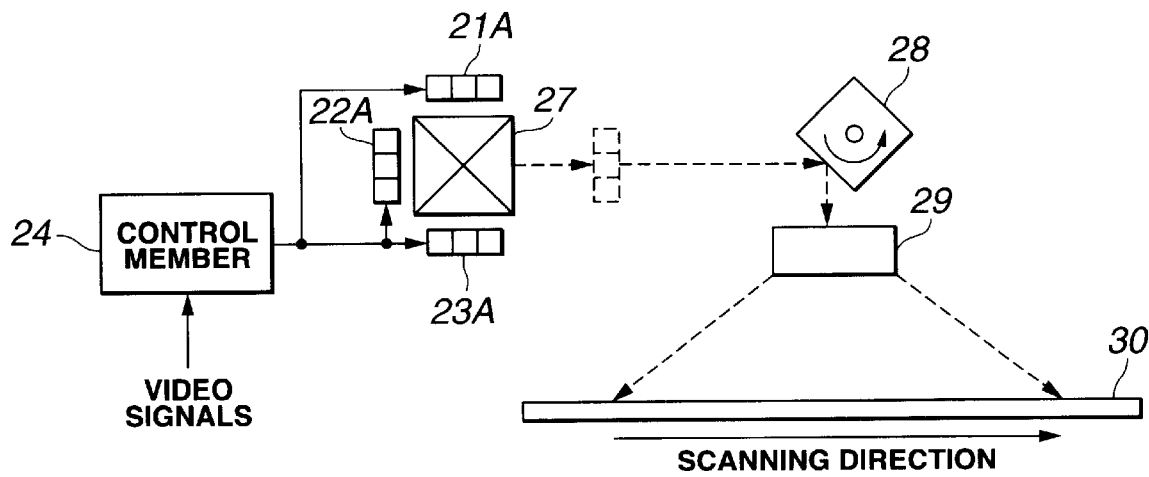
FIG. 6 is a diagram showing in summary the configuration of the image display device of a fourth aspect of this invention, seen from above.

FIG. 6 shows in summary the configuration of the image display device of a fourth aspect of this invention, seen from above. Members which are the same as in FIG. 4 are assigned the same symbols for explanations.

In FIG. 6, a difference with FIG. 4 is the use of an array of LEDs, lasers, or other emissive devices as one-dimensional display devices, a plurality (in the figure, three) of which are comprised by the first, second and third columnar display units 21A, 22A, 23A for each color. By this means, the light source 25 and color separation means 26 in FIG. 4 become unnecessary. Hence the image display device has first, second, and third columnar display units 21A, 22A, 23A; a control member 24; optical combination means 27; perpendicular deflection means 28; an image-forming optical system 29; and a screen 30. The first columnar display unit 21A comprises a plurality (in the figure, three) of one-dimensional emissive arrays, arranged in parallel, which emit light of a first color (for example, red). The second columnar display unit 22A comprises a plurality (in the figure, three) of one-dimensional emissive arrays, arranged in parallel, which emit light of a second color (for example, green). The third columnar display unit 23A comprises a plurality (in the figure, three) of one-dimensional emissive arrays, arranged in parallel, which emit light of a third color. Otherwise the configuration is similar to that of FIG. 4. By this means, the configuration can be simplified.

Next, the action of FIG. 6 is explained.

In the aspect of FIG. 6, each color of a two-dimensional image is displayed sequentially several lines at a time, equal to the number of one-dimensional emissive arrays of the first, second and third columnar display units 21A, 22A, 23A; the several lines' worth of image light beams emitted from each of the columnar display units are combined into one by the optical combination means 27, such that there is no shift in position. The combined image light beam is deflected in directions perpendicular to the longitudinal direction of the columnar display units by the perpendicular deflection means 28, and by passing through the image-forming optical system 29, defocusing caused by changes in the projection distance is corrected, and several lines' worth of an image is formed on the screen 30. Through high-speed execution of rewriting of the images of the columnar display units and of deflection by the perpendicular deflection means 28, a two-dimensional image can be displayed. By this means, a two-dimensional image of higher resolution than that described in the third aspect is displayed.

Fifth Aspect of the Invention

Figure 7:
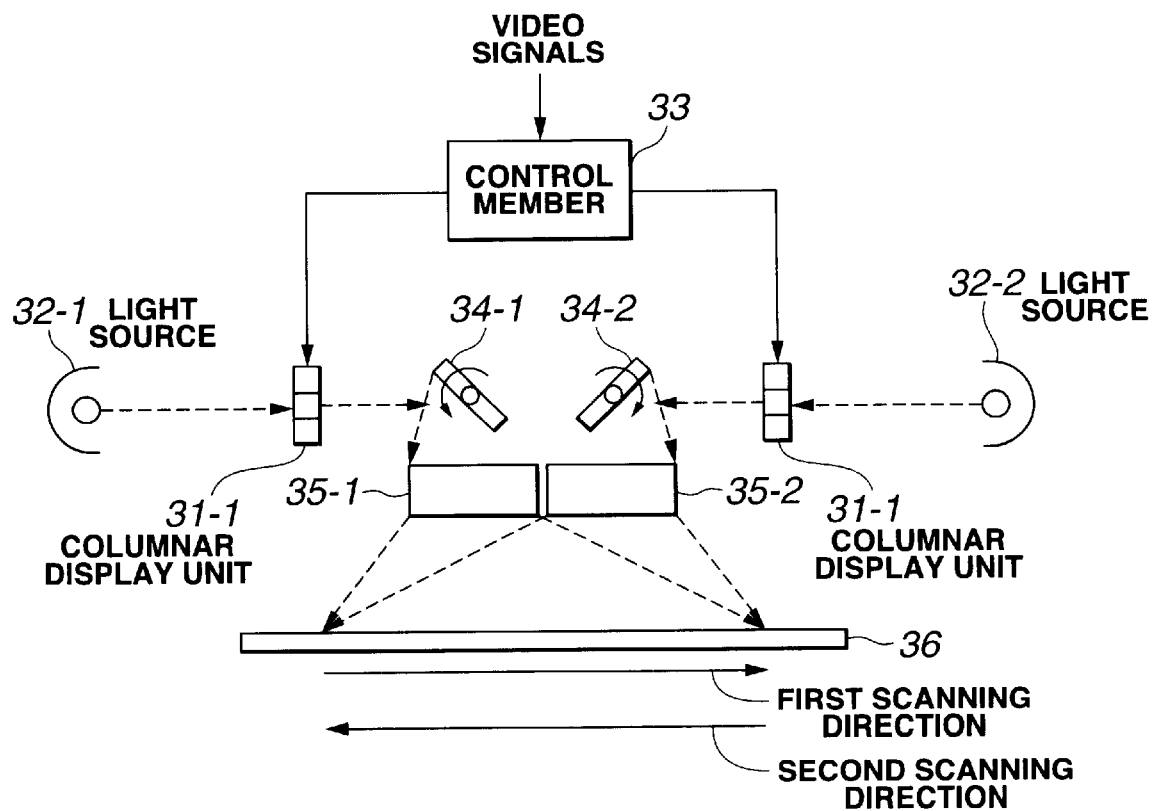
FIG. 7 is a diagram showing in summary the configuration of the image display device of a fifth aspect of this invention, seen from above.

FIG. 7 shows in summary the configuration of the image display device of a fifth aspect of this invention, seen from above. The image display device has a plurality (in the figure, two) of columnar display units 31-1, 31-2, in which a plurality of one-dimensional optical modulation means are combined as a single columnar display unit; at least one light source, 32-1, 32-2; a control member 33; a plurality of perpendicular deflection means 34-1, 34-2; a plurality of image-forming optical systems 35-1, 35-2; and a screen 36.

The plurality of columnar display units 31-1, 31-2 are a plurality of columnar display units in which a plurality (in the figure, three) of one-dimensional optical modulation means, corresponding to a plurality of colors (in the figure, red, green and blue), are combined. The one-dimensional optical modulation means are similar to that in FIG. 1.

The light sources 32-1, 32-2 are white light sources containing as components the three primary colors, and irradiate the plurality of columnar display units.

Analog video signals are input to the control member 33, which applies image signals appropriate to the plurality of respective columnar display units 31-1, 31-2.

The plurality of perpendicular deflection means 34-1, 34-2 comprise, for example, a galvano-mirror (planar mirror), and deflect light leaving the plurality of columnar display units 31-1, 31-2 in directions perpendicular to the respective column directions.

The plurality of image-forming optical systems 35-1, 35-2 comprise a combination of a plurality of optical lenses, and produce an image on a screen which is free from defocusing, even if the distance from the plurality of columnar display units 31-1, 31-2 to the screen changes.

The screen 36 causes an image to be formed by sequential scanning of the images displayed on the plurality of columnar display units 31-1, 31-2.

In the above configuration, the number of columnar display units comprising a plurality of one-dimensional optical modulation means, and the number of perpendicular deflection means, must be the same. That is, a plurality of sets of one columnar display unit and one perpendicular deflection means is necessary. Light sources may be provided in the same number as the above sets, or a single light source may be divided. A configuration may also be employed in which, instead of using transmissive one-dimensional display devices, one-dimensional emissive arrays are used.

Next, the action of FIG. 7 is explained.

In the aspect of FIG. 7, a two-dimensional image is displayed sequentially a number of lines at a time equal to the number of the plurality of one-dimensional optical modulation means in each of the plurality (in the figure, two) of columnar display units 31-1, 31-2, and when these are irradiated by the light sources 32-1, 32-2, several lines' worth of modulated image light beams are emitted from the two columnar display units 31-1, 31-2. The emitted plurality of several lines' worth of image light beams are deflected in direction perpendicular to the longitudinal direction of the columnar display units 31-1, 31-2 by the two perpendicular deflection means 34-1, 34-2; pass through the image-forming optical systems 35-1, 35-2; defocusing caused by changes in the projection distance is corrected; and several lines' worth of an image is formed at two places on the screen 36. On the same screen 36, at the same time that, for example, three lines' worth of image light beams transmitted through the columnar display unit 31-1 as shown in FIG. 7 are scanned in a first scanning direction, three lines' worth of image light beams transmitted through the columnar display unit 31-2 are scanned in a second scanning direction. Through high-speed execution of rewriting of the images of the columnar display units 31-1, 31-2 and of deflection by the perpendicular deflection means 34-1, 34-2, a two-dimensional image can be displayed. By means of the above method, the rewrite speed of the one-dimensional display devices serving as the one-dimensional optical modulation means comprised by each of the columnar display units may be slower than those used in the aspects of FIG. 1 and FIG. 5 (that is, the scanning speed may be ½ as large) while still obtaining an effect equal to that of FIG. 1 and FIG. 5.

Figure 8A:
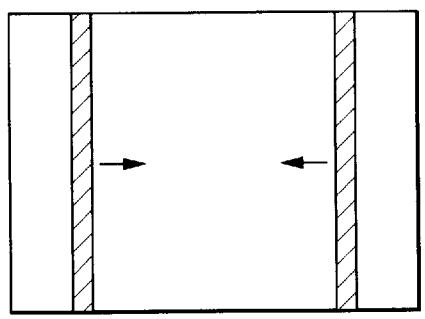
FIG. 8A and FIG. 8B are diagrams which explain two image scanning examples in the fifth aspect.
Figure 8B:
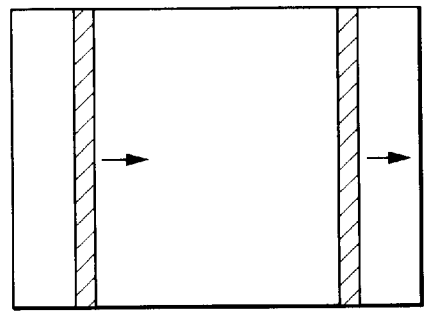

Two columnar display units 31-1, 31-2 and two perpendicular deflection means 34-1, 34-2 may scan from both edges towards the center of the screen 36, passing each other and scanning until the opposite edges, as in FIG. 7 and FIG. 8A; or, scanning in order may be in the same direction on the screen 36, as in FIG. 8B.

In either scanning method, overlapping occurs over the entire screen, so that areas which are especially bright do not readily occur. Further, even one-dimensional display devices with slower rewrite speeds can be used; compared with the aspects of FIG. 1 and FIG. 5, there is the advantage that the burden placed on the display devices is reduced. If deflection and scanning is performed at the same speed as in the aspects of FIG. 1 and FIG. 5, there are the advantages that a brighter image is obtained and that no flicker occurs in the displayed image. Hence this is expedient for obtaining higher resolutions and larger images.

A columnar display units comprising a plurality of one-dimensional optical modulation means corresponding to a plurality of colors is, so to speak, a unit enabling single-panel color display; but the aspect of FIG. 7 is configured with a plurality of columnar display units. Instead of the configuration of FIG. 7, by providing columnar display units for each color (red, green, blue) on the left and right sides, still higher image quality becomes possible. Such a configuration is explained below as a sixth aspect.

Sixth Aspect of the Invention

FIG. 9 shows in summary the configuration of the image display device of a sixth aspect of this invention, seen from above.

In the image display device of the sixth aspect, the columnar display unit 31-1 on the left side of the aspect of FIG. 7 comprises three columnar display units 21-1, 22-1, 23-1 for each of first, second and third colors (for example, red, green and blue) as in FIG. 4. Light from a first light source 25-1 is also separated into three colors by first color separation means 26-1, and light in these three colors is made incident on each of the respective color-specific columnar display units 21-1, 22-1, 23-1; after passing through the three color-specific columnar display units 21-1, 22-1, 23-1, image light beams are combined by a dichroic prism or other first optical combination means 27-1, deflected by first perpendicular deflection means 34-1, pass through an image-forming optical system 35-1, and are corrected for defocusing and projected onto a screen 36. The columnar display unit 31-2 on the right side in FIG. 7 similarly comprises, as shown in FIG. 4, three columnar display units 21-2, 22-2, 23-2 for a first, second and third color (for example, red, green, blue). Light from a second light source 25-2 is also separated into three colors by second color separation means 26-2, and light in these three colors is made incident on each of the respective color-specific columnar display units 21-2, 22-2, 23-2; after passing through the three color-specific columnar display units 21-2, 22-2, 23-2, image light beams are combined by second optical combination means 27-2, deflected by second perpendicular deflection means 34-2, pass through a second image-forming optical system 35-2, and are corrected for defocusing and projected onto a screen 36. On the screen 36, color display light deflected and scanned from the two systems is scanned sequentially for display by scanning methods such as those explained in FIG. 7 and FIG. 8. By means of a configuration in which the first and second light sources 25-1, 25-2 comprise a single common light source, the first and second color separation means 26-1, 26-2 can also comprise a single common color separation means. That is, light from a single light source may be separated to obtain light in the three R, G, B colors for use.

In other words, the image display device of the sixth aspect comprises a plurality (two in the figure, on the left and right sides) of first columnar display units 21-1, 21-2, in which a plurality (in the figure, three) of one-dimensional optical modulation means which modulate light of a first color (that is, red) are combined into a single columnar display unit; a plurality (two in the figure, on the left and right sides) of second columnar display units 22-1, 22-2, in which a plurality (in the figure, three) of one-dimensional optical modulation means which modulate light of a second color (that is, green) are combined into a single columnar display unit; a plurality (two in the figure, on the left and right sides) of third columnar display units 23-1, 23-2, in which a plurality (in the figure, three) of one-dimensional optical modulation means which modulate light of a third color (that is, blue) are combined into a single columnar display unit; at least one light source 25-1, 25-2 containing the first, second and third color components and which irradiate the above pluralities of first, second and third columnar display units; at least one color separation means 26-1, 26-2 which separates light leaving the above light sources into each of the first, second and third color components; a control member 33 which applies image signals appropriate to each of the above pluralities of first, second and third columnar display units; a plurality of optical combination means 27-1, 27-2 which combine the three-color light leaving each of the columnar display units for each color comprised by the above pluralities of first, second and third columnar display units; a plurality of perpendicular deflection means 34-1, 34-2 which deflect, in directions perpendicular to the column direction, the plurality of columnar light beams combined by the above plurality of optical combination means; a plurality of image-forming optical systems 35-1, 35-2 which produce on a screen an image, free from defocusing even when the distance from the above pluralities of first, second and third columnar display units to the screen changes; and a screen 36 for forming of the image displayed on the pluralities of first, second and third columnar display units.

The dichroic mirrors D1, D2 and mirrors M1, M2, M3 in the above color separation means 26-1, 26-2 have functions and actions similar to those in FIG. 4.

Video signals are input to the above control member 33. When scanning simultaneously in first and second scanning directions from both edges of the screen 36 toward the center, the control member temporarily holds the video signals forming a single image, to enable display of a single image; generates first R, G, B signals and second R, G, B signals for the first and second video signals read from positions corresponding to the left and the right sides of the screen; applies first and second R signals to the two first column display units 21-1, 21-2 respectively; applies first and second G signals to the two second column display units 22-1, 22-2 respectively; and applies first and second B signals to the two third column display units 23-1, 23-2 respectively.

Next, the action of the sixth aspect is explained.

In the configuration of the sixth aspect, for each color a two-dimensional image is displayed sequentially a number of lines at a time equal to the number of the plurality of one-dimensional optical modulation means in each of the plurality of first, second and third columnar display units, and several lines' worth of image light beams emitted from each of the columnar display units are combined into one by the optical combination means. The combined image light beam is deflected in directions perpendicular to the longitudinal direction of the columnar display units by perpendicular deflection means, and passes through an image-forming optical system; defocusing due to changes in the projection distance is corrected, and several lines' worth of an image is formed at a plurality of positions on the screen. Through high-speed execution of rewriting of the images of the columnar display units and of deflection by the perpendicular deflection means, a two-dimensional image can be displayed. By means of the above method, the rewrite speed of the one-dimensional display devices may be slower than those used in FIG. 4 and FIG. 6, while still obtaining an effect equal.

Seventh Aspect of the Invention

Figure 10:
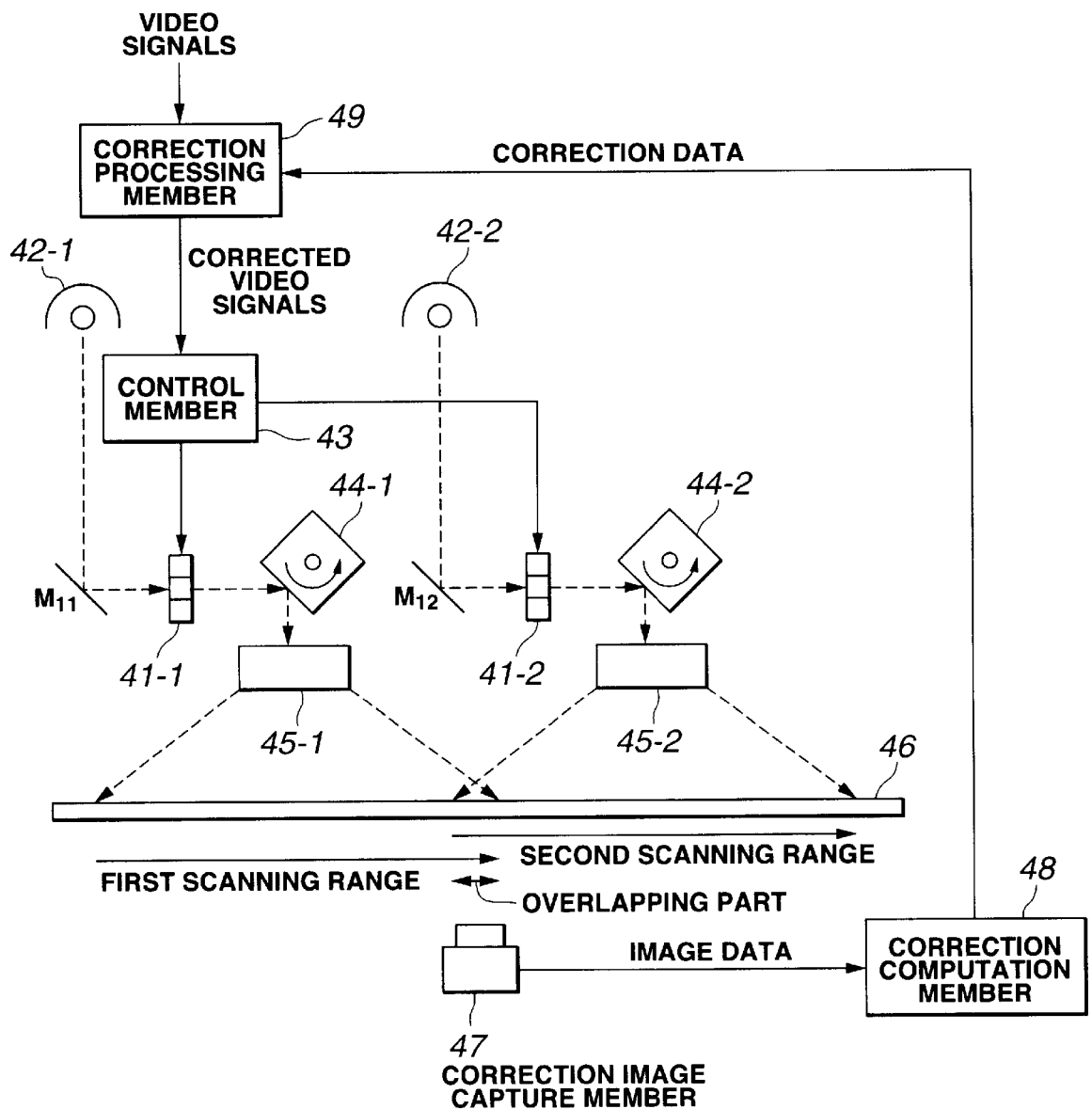
FIG. 10 is a diagram showing in summary the configuration of the image display device of a seventh aspect of this invention, seen from above.

FIG. 10 shows in summary the configuration of the image display device of a seventh aspect of this invention, seen from above. The image display device comprises a plurality (in the figure, two) of columnar display units 41-1, 41-2, in which a plurality of one-dimensional optical modulation means are combined as a single columnar display unit; at least one light source 42-1, 42-2; a control member 43; a plurality of perpendicular deflection means 44-1, 44-2; a plurality of image-forming optical systems 45-1, 45-2; a screen 46; a correction image capture member 47 which is image capture means for use in correction; a correction computation member 48 which is computation means for use in correction; and a correction processing member 49 which is processing means for use in correction.

The plurality of columnar display units 41-1, 41-2 are a plurality of columnar display units in which a plurality (in the figure, three) of one-dimensional optical modulation means, corresponding to a plurality of colors (in the figure, red, green, blue), are combined as a set. The one-dimensional optical modulation means are similar to those in FIG. 1.

The light sources 42-1, 42-2 are white light sources containing the three primary color components, and irradiate the plurality of columnar display units 41-1, 41-2.

Corrected video signals from the correction processing member 49, described below, are input to the control member 43, which applies image signals appropriate to the plurality of respective columnar display units 41-1, 41-2. For example, a video signal constituting one image is divided into two video signals, corresponding to the left and right areas, for supply to the two columnar display units 41-1, 41-2 respectively.

The plurality of perpendicular deflection means 44-1, 44-2 each comprise, for example, a polygon mirror (rotating multi-faced mirror), and each deflects light emitted from the plurality of columnar display units 41-1, 41-2 in directions perpendicular to the column direction.

The plurality of image-forming optical systems 45-1, 45-2 comprise a combination of a plurality of optical lenses, to produce an image on the screen which is free of defocusing even when the distance from the plurality of columnar display units 41-1, 41-2 to the screen changes.

On the screen 46, the two images displayed on the plurality of columnar display units 41-1, 41-2 are formed, so as to overlap only in the neighboring area.

The correction image capture member 47 comprises, for example, a digital camera, is positioned in front of the screen 46, and captures images displayed on the screen 46.

The correction computation member 48 detects changes in brightness in areas on the screen from the image data captured by the correction image capture member 47, and based on the detection results, computes a correction amount.

The analog video signal is input to the correction processing member 49, which performs corrections to the video signal based on the correction amount from the correction computation member 48, and supplies the result to the control member 43.

In the above configuration, the number of columnar display units comprising a plurality of one-dimensional optical modulation means, and the number of perpendicular deflection means, must be the same. That is, a plurality of sets of one columnar display unit and one perpendicular deflection means is necessary. A number of light sources equal to the number of the above sets may be provided, or a single light source may be divided. A configuration may also be employed in which, instead of transmissive one-dimensional display devices, one-dimensional emissive arrays are used.

Next, the action of FIG. 10 is explained.

In the aspect of FIG. 10, a two-dimensional image is displayed sequentially several lines at a time, equal to the number of one-dimensional display devices of each of the plurality of columnar display units 41-1, 41-2, and several lines' worth of a modulated image light beam are emitted. The plurality of lines' worth of image light beam emitted are deflected, in directions perpendicular to the longitudinal direction of the columnar display units 41-1, 41-2, by corresponding perpendicular deflection means 44-1, 44-2, and by passing through the image-forming optical systems 45-1, 45-2, defocusing caused by changes in the projection distance are corrected, and several lines' worth of an image are formed at two positions on the screen 46. Through high-speed execution of rewriting of the images of the columnar display units 41-1, 41-2 and of deflection by the perpendicular deflection means 44-1, 44-2, a two-dimensional image can be displayed. On the same screen 46, for example as shown in FIG. 10, three lines' worth of image light beams may be scanned over a first scanning area after passing through the columnar display unit 41-1, while at the same time three lines' worth of image light beams may be scanned over a second scanning area after passing through the columnar display unit 41-2. That is, a single image may be divided by the control member 43 into, for example, a plurality of areas (in the figure, two), and image signals output for supply to the two columnar display units 41-1, 41-2, respectively. Through the scanning of three lines' worth of image light beams after passing through the first columnar display unit 41-1, an image is displayed in one of the above divided areas; and through the scanning of three lines' worth of image light beams after passing through the second columnar display unit 41-2, an image is displayed in the other divided area (see FIG. 11A).

Figure 11A:
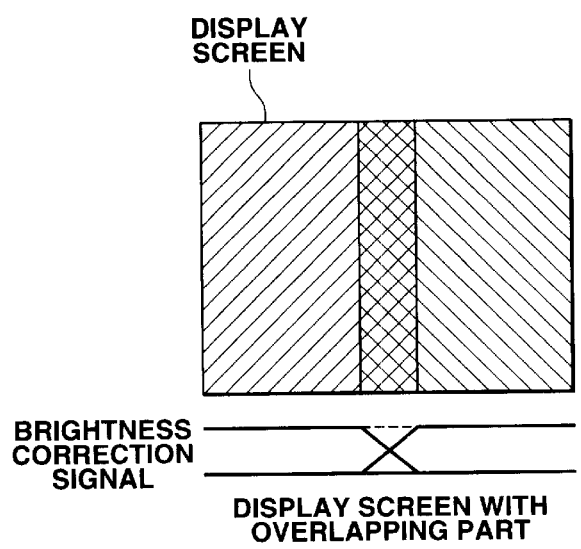
FIG. 11A and FIG. 11B are diagrams which explain action in the seventh aspect.

At this time, the two image light beams are scanned over the screen 46 for display, as shown in FIG. 11A; the two display images may be displayed with no overlap of adjacent parts, or may be displayed with overlap of adjacent parts.

When displaying the two display images with no overlap of adjacent parts, the adjacent parts of the two display images may become a separated seam, in which case there is the defect that the seam becomes conspicuous. In particular, when a large image is formed from numerous images, seams are conspicuous. However, when a plurality of images have separate content, seams do not pose a problem in particular.

Figure 11B:
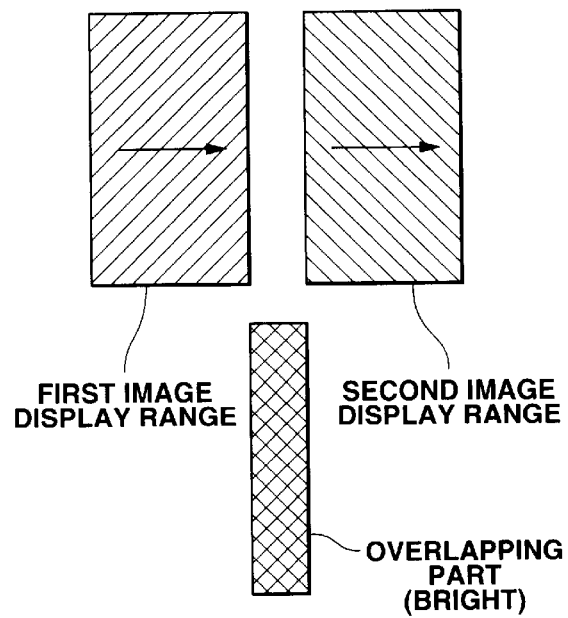

Next, the case in which the parts adjacent to two display images overlap, as in FIG. 10 and FIG. 11A, is explained. The brightness visible to the human eye corresponds to an integral value with respect to time, so that, because the above overlapping part is scanned twice the number of times (in a fixed amount of time) as the non-overlapping parts, it appears to be bright, as in FIG. 11B. That is, the overlapping part appears as a stripe-shaped area of uneven brightness. However, if this unevenness in brightness can be canceled, this method should be more useful for the formation of large images without conspicuous seams than the above-described method of display without overlap.

In order to correct the brightness of overlapping parts, a correction image capture member 47 is used to capture the image displayed on the screen 46, to obtain image data. In the correction image capture member 47, the image data is sent to a correction computation member 48, and the correction computation member 48 performs computations to obtain correction amounts to correct for brightness unevenness, color unevenness, position shifts, distortion, color shifts, and other problems, and sends the correction amount data to the correction processing member 49. The correction processing member 49 performs processing for brightness and other correction of the image signal, based on the correction amount data received. Where correction of the brightness of the overlapping part is concerned, the correction processing member 49 creates a brightness correction signal, liked that shown beneath the display image with overlapping part in FIG. 11A, and adds correction to the first and second divided video signals so as to lower the amplitude level of the video signal at positions corresponding to the high-brightness part where there is overlap, enabling correction so as to eliminate brightness unevenness in the overlapping area. By eliminating brightness unevenness in the overlapping area, a single large image without seams can be displayed.

Figure 12A:
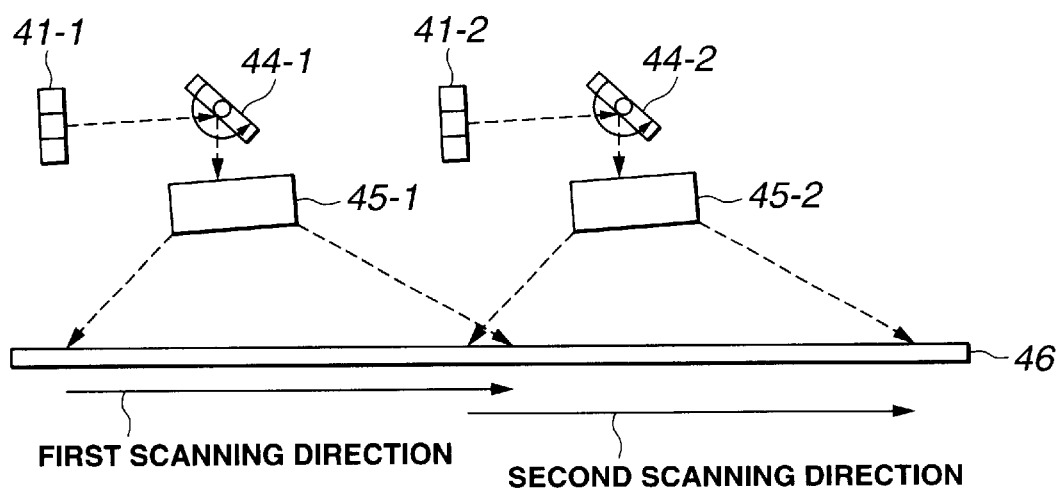
FIG. 12A, FIG. 12B, and FIG. 12C are diagrams which explain the geometric distortion and position shifting which occurs upon parallel display of a plurality of images.
Figure 12B:
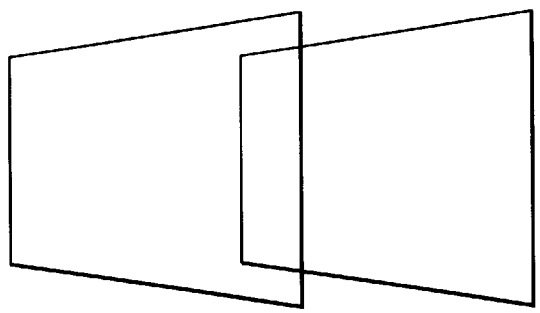
Figure 12C:
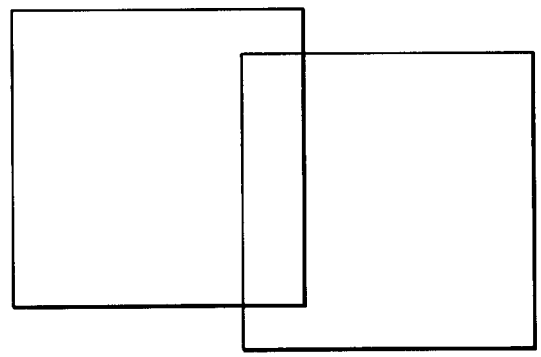

In the above explanation of the aspect of FIG. 10, brightness unevenness occurring in the overlapping part is corrected. The columnar display unit 41-1, perpendicular deflection means 44-1 and image-forming optical system 45-1 which are in charge of the left area on the screen, and the columnar display unit 41-2, perpendicular deflection means 44-2 and image-forming optical system 45-2 which are in charge of the right area on the screen, are positioned in nearly the central positions of each of the divided left and right display areas to form images. If, as shown in FIG. 12A, these components are positioned on one side of the placement positions in FIG. 10, for example to project onto the left and right areas of the screen from a position displaced to the left side, the display image on the screen becomes a trapezoidal shape as shown in FIG. 12B, and so-called optical distortion occurs. Placement such as that in FIG. 12A may occur in circumstances in which, for example, each device is placed so as to display in parallel four images on the same screen with overlapping areas. When the positions with respect to the screen of the above two columnar display units 41-1, 41-2 are shifted in the vertical direction, a shift in the position (a positional shift) in the right and left displayed images occurs, as shown in FIG. 12C. A configuration can also be employed, in consideration of such geometric distortion and shifts in image display positions, in which the correction computation member 48 creates correction data for geometric distortion and positional shifts based on image data captured by the correction image capture member 47 shown in FIG. 10, and video signals are corrected by the correction processing member 49. By means of the above method, not only brightness unevenness and color unevenness occurring in overlapping parts, but also geometric distortion and positional shifts such as those shown in FIG. 12B and FIG. 12C can be eliminated, and color shifts can also be eliminated based on image data acquired from the image capture member 47.

Figure 13A:
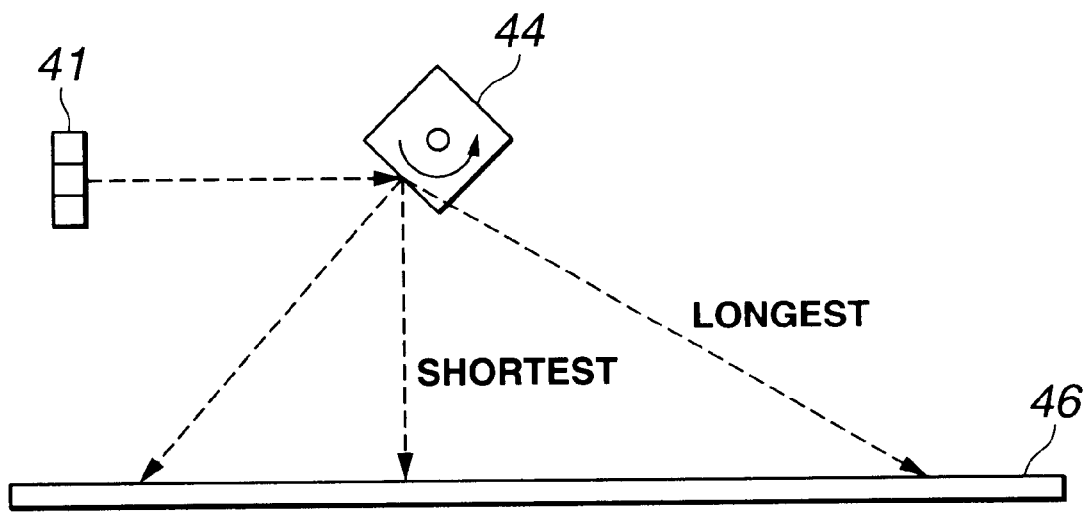
FIG. 13A and FIG. 13B are diagrams which explain the principle which causes changes in density of displayed pixels, and the state of its occurrence.
Figure 13B:
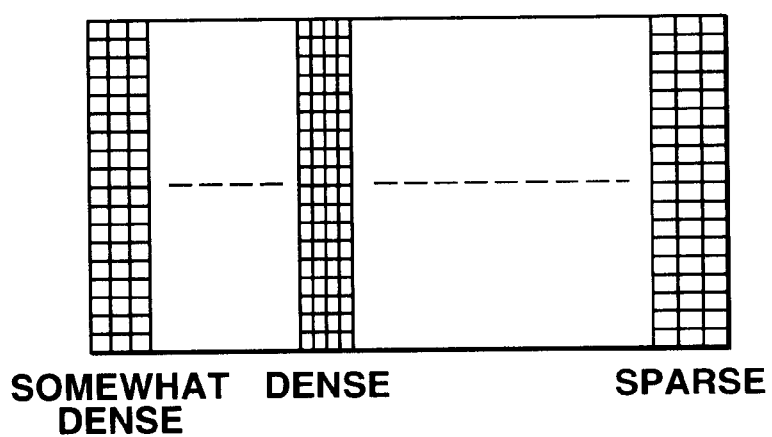

As shown in FIG. 13A, by means of the rotation of the polygon mirror or other perpendicular deflection means 44, the image light beam from the columnar display unit 41 is deflected and scanned over the screen 46 (in actuality, passing through an image-forming optical system to be scanned over the screen; but here the discussion of the image-forming optical system is omitted); the distance of projection by the perpendicular deflection means 44 onto the screen 46 grows longer as the edges of the screen are approached, and the perpendicular distance from the perpendicular deflection means 44 to the surface of the screen 46 is the shortest distance. The area of a pixel light beam projected onto the screen 46 broadens as the projection distance lengthens, and decreases in size as the project distance shortens; hence pixel light beams projected onto the screen 46 undergo changes in density in the direction perpendicular to the direction of the axis of rotation of the perpendicular deflection means 44, that is, in the horizontal direction, depending on the projection position as shown in FIG. 13B. In order to eliminate this change in density of pixels, the rate of rotation (that is, the rate of deflection) of the perpendicular deflection means 44 should be changed according to the display position.

Figure 14:
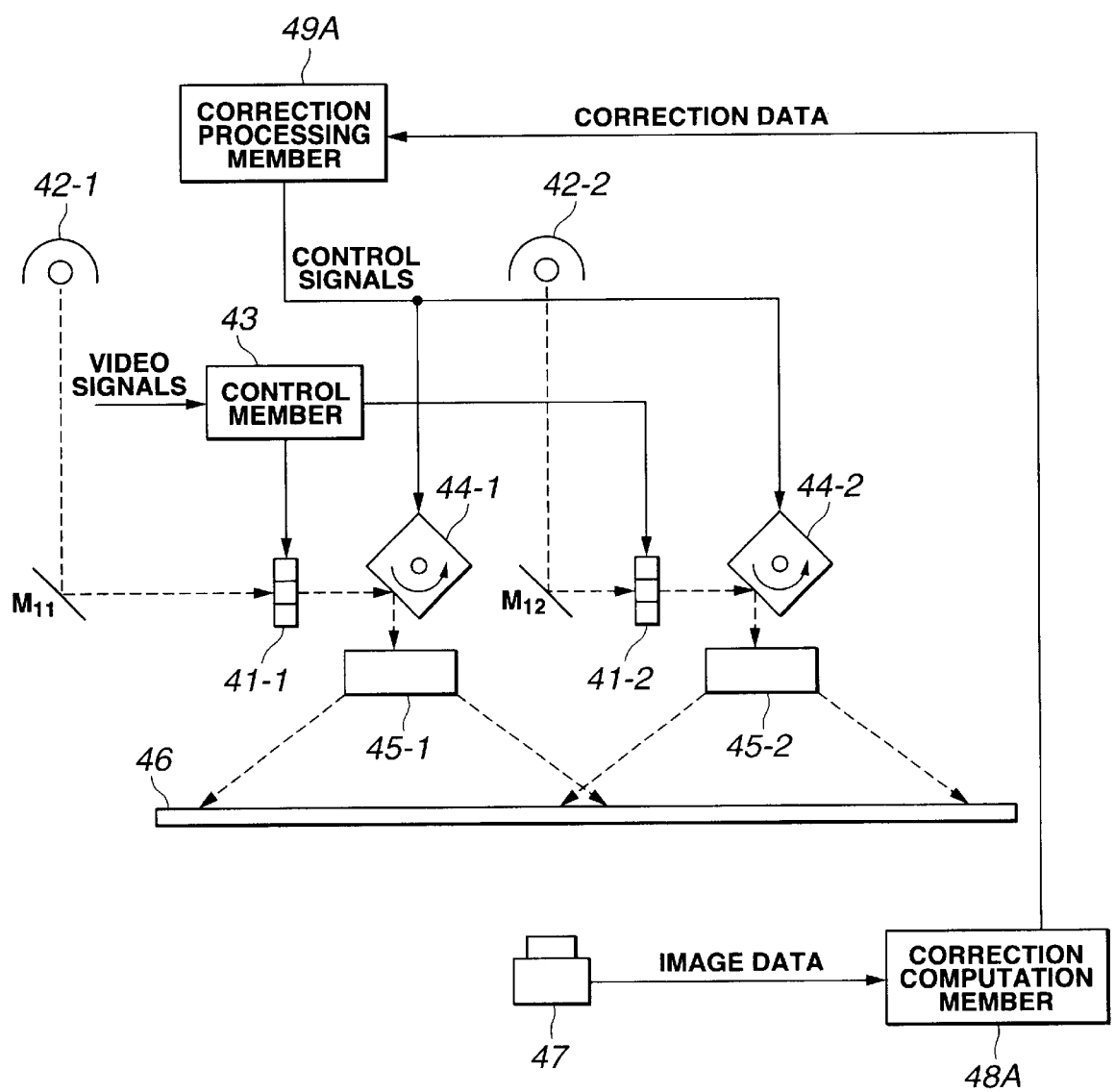
FIG. 14 is a diagram showing a configuration which cancels changes in density of pixels.

A configuration which eliminates changes in pixel densities, corresponding to the aspect of FIG. 10, is explained referring to FIG. 14. In FIG. 14, a difference with FIG. 10 is the fact that in the correction computation member 48A, deflection speed correction data is created based on the density of pixel data at the display position in the image data captured by the correction image capture member 47, and is supplied to the correction processing member 49A, which is correction processing means. The deflection speed correction data is data which performs correction toward lower density, approaching a reference value for density, if the pixels displayed on the screen 46 are dense, and which performs correction toward higher density, approaching the above reference value, if the pixels displayed are sparse. In the correction processing member 49A, control signals are generated to control the deflection speeds of the perpendicular deflection means 44-1, 44-2 based on this deflection speed correction data, and are supplied to the perpendicular deflection means 44-1, 44-2 respectively. By this means, each of the perpendicular deflection means 44-1, 44-2 exercises control to quicken the perpendicular deflection speed if pixels displayed on the screen 46 are dense, and to slow the perpendicular deflection speed if pixels displayed are sparse.

In the above aspect of FIG. 7, instead of a plurality of one-dimensional optical modulation means, a single line's worth of one-dimensional optical modulation means may be used; or, instead of a plurality of one-dimensional optical modulation means, a one-dimensional emissive array, or a unit combining a plurality of one-dimensional emissive arrays, may be used.

In FIG. 10, it is possible in principle to further increase the number of columnar display units so as to display any size image. Hence by combining a plurality of columnar display units, a plurality of perpendicular deflection means and a plurality of image-forming optical systems, to project on the above screen a plurality of images, a single image can be displayed, and its size can be increased. However, when a plurality of images are combined, areas adjacent to the plurality of images overlap; but by performing corrections for brightness and other unevenness in overlapping areas using a correction image capture member, correction computation member, and correction processing member, images can be displayed with high image quality even when the image size is increased.

That is, the two-dimensional image displayed on the screen has overlapping areas. The correction image capture member captures the image displayed on the screen, with its overlapping parts, to obtain image data. The correction image capture member sends this image data to the correction computation member; the correction computation member performs computations to obtain correction amounts, in order to perform corrections such that no difference can be seen in the brightness of parts which are overlapping and parts which are not, and sends this correction amount data to the correction processing member. The correction processing member performs correction processing of the brightness of the image signal based on the received correction amount data. As a result, differences in brightness occurring in overlapping parts are eliminated. By means of the above method, a single large-screen, high-resolution two-dimensional image with high image quality and without seams can be obtained.

A columnar display unit comprising a plurality of one-dimensional modulation means corresponding to a plurality of colors is a unit capable of so-called single-panel color display; but the aspect of FIG. 10 is configured with a plurality of such columnar display units, in order to combine in an array divided images to obtain a large image. By adopting a configuration in which each of the columnar display units on the left and right in the configuration of FIG. 10 are provided for each color (R, G, B), still higher image quality is possible. Such a configuration is explained below as an eighth aspect.

Eighth Aspect of the Invention

Figure 15:
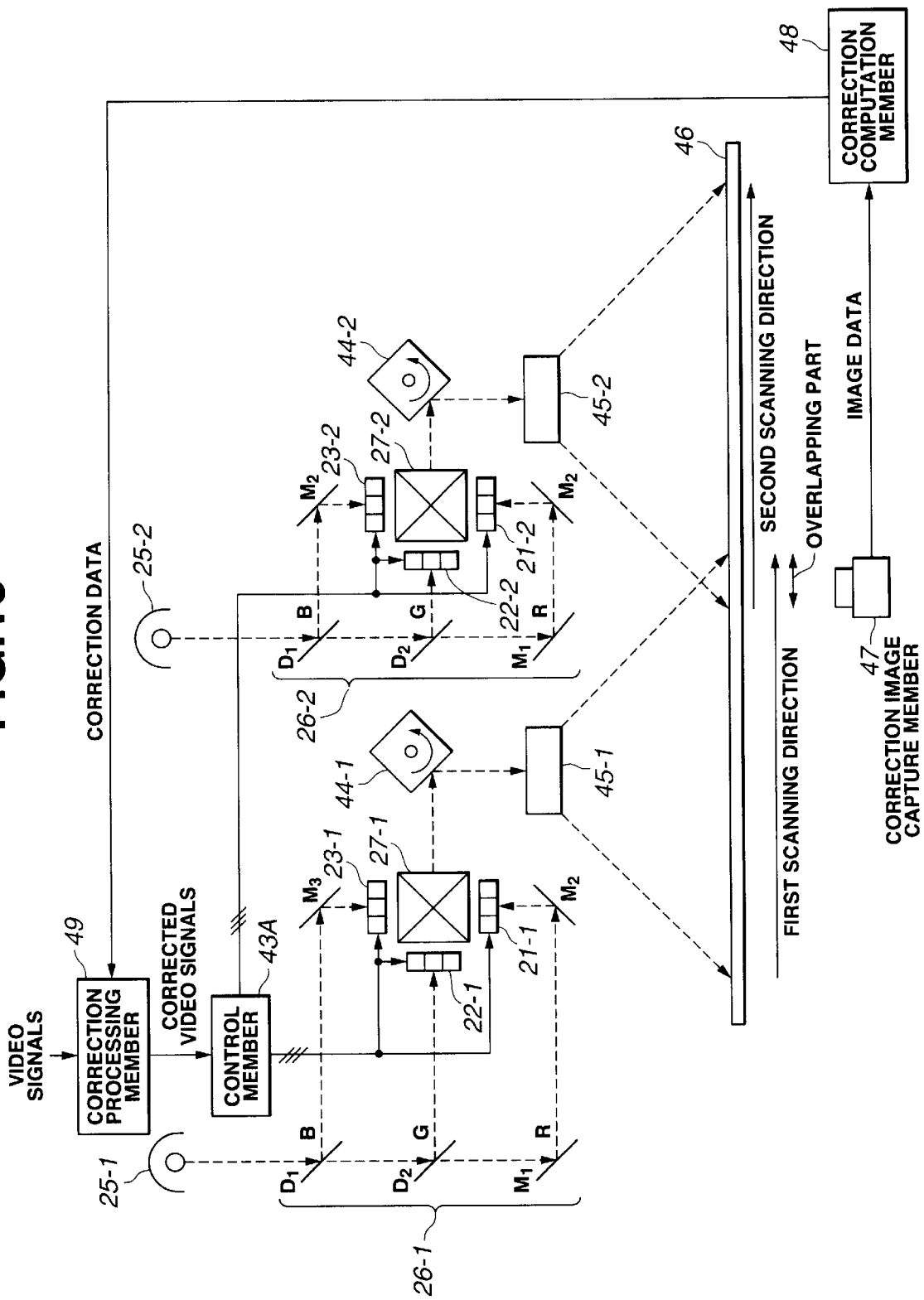
FIG. 15 is a diagram showing in summary the configuration of the image display device of an eighth aspect of this invention, seen from above.

FIG. 15 shows in summary the configuration of the image display device of an eighth aspect of this invention, seen from above.

In the image display device of the eighth aspect, the columnar display unit 41-1 on the left side in the aspect of FIG. 10 comprises three columnar display units 21-1, 22-1, 23-1 specifically for a first, second and third color (for example, red, green, blue) as in FIG. 4; light from the first light source 25-1 is separated into three colors by the first color separation means 26-1, and light of each color irradiates the columnar display units 21-1, 22-1, 23-1 for the respective colors; image light beams, having passed through the three columnar display units 21-1, 22-1, 23-1 for each of the three colors, are combined by a dichroic prism or other first optical combination means 27-1; the combined light is deflected by first perpendicular deflection means 44-1, passes through the image-forming optical system 45-1, is corrected for defocusing, and is incident on the screen 46. Similarly, the columnar display unit 41-2 on the right side in the aspect of FIG. 10 comprises three columnar display units 21-2, 22-2, 23-2 specifically for a first, second and third color (for example, red, green, blue) as in FIG. 4; light from the second light source 25-2 is separated into three colors by the second color separation means 26-2, and light of each color irradiates the columnar display units 21-2, 22-2, 23-2 for the respective colors; image light beams, having passed through the three columnar display units 21-2, 22-2, 23-2 for each of the three colors, are combined by a dichroic prism or other second optical combination means 27-2; the combined light is deflected by second perpendicular deflection means 44-2, passes through the second image-forming optical system 45-2, is corrected for defocusing, and is incident on the screen 46. On the screen 46, color display light beams deflected and scanned from the two systems are positioned and displayed, having overlapping areas as a result of a scanning method such as explained in FIG. 10. By configuring the first and second light sources 25-1, 25-2 as a single light source, the first and second color separation means 26-1, 26-2 can also be configured as a single color separation means. That is, a configuration may be employed in which light from a single light source is separated to obtain for use light in the three R, G, B colors.

That is, the image display device of the eighth aspect comprises a plurality (two in the figure, on the right and left) of first columnar display units 21-1, 21-2, in which a plurality (in the figure, three) of one-dimensional optical modulation means which modulate light of a first color (that is, red) are arranged as a single columnar display unit; a plurality (two in the figure, on the right and left) of second columnar display units 22-1, 22-2, in which a plurality (in the figure, three) of one-dimensional optical modulation means which modulate light of a first color (that is, green) are arranged as a single columnar display unit; a plurality (two in the figure, on the right and left) of third columnar display units 23-1, 23-2, in which a plurality (in the figure, three) of one-dimensional optical modulation means which modulate light of a first color (that is, blue) are arranged as a single columnar display unit; a control member 43A which applies image signals appropriate to the above respective pluralities of first, second, and third columnar display units; at least one light source 25-1, 25-2, containing the first, second and third color components, and which irradiate the above pluralities of first, second, and third columnar display units; at least one color separation means 26-1, 26-2, which separate light from the above light sources into each of the first, second, and third color components; a plurality of optical combination means 27-1, 27-2 which combine light in three colors leaving one of each of the above first, second, and third columnar display units for each color; a plurality of perpendicular deflection means 44-1, 44-2 which deflect, in directions perpendicular to the column direction, the plurality of columnar light beams in three colors combined by the above plurality of optical combination means; a plurality of image-forming optical systems 45-1, 45-2, which produce an image on a screen which is free of defocusing even when the distance from the above pluralities of first, second, and third columnar display units to the screen changes; a screen 46 for forming the image displayed on the plurality of first, second, and third columnar display units; a correction image capture member 47, which is image capture means for correction which captures the image displayed on the above screen; a correction computation member 48, which is computation means for correction which computes correction amounts from image data captured by the above correction image capture member; and, a correction processing member 49, which is processing means for correction which applies correction to image signals based on correction amounts from the above correction computation member.

The dichroic mirrors D1, D2 and mirrors M1, M2, M3 in the above color separation means 26-1, 26-2 have functions and actions similar to those in FIG. 4.

Corrected video signals from the correction processing member 49 are input to the above control member 43A, which temporarily holds the video signals forming a single image, to enable division of the image of the video signals into first and second scanning ranges on the left and right sides of the screen 46 for display. The control member divides the video signals into first and second video signals corresponding to the right and left areas; generates first R, G, B signals and second R, G, B signals for the respective divided first and second video signals; applies the first and second R signals to the two first columnar display units 21-1, 21-2; applies the first and second G signals to the two second columnar display units 22-1, 22-2; and applies the first and second B signals to the two third columnar display units 23-1, 23-2.

Next, the action of the eighth aspect is explained.

In this eighth aspect, a two-dimensional image is displayed sequentially for each color several lines at a time, equal to the number of one-dimensional optical modulation means of each of the pluralities of first, second and third columnar display units, and several lines' worth of an image light beam are emitted from each of the columnar display units are combined into one by optical combination means. The combined image light beam is deflected in directions perpendicular to the longitudinal direction of the columnar display units by perpendicular deflection means, passes through an image-forming optical system, and is corrected for defocusing caused by changes in the projection distance, and several lines' worth of the image are formed at a plurality of positions on the screen. Through high-speed execution of rewriting of the images of the columnar display units and of deflection by the perpendicular deflection means, a two-dimensional image can be displayed. Here, the two-dimensional image displayed by combining columnar display units and perpendicular deflection means has an overlapping part. The image displayed on the screen, with this overlapping part, is captured by the correction image capture member to obtain image data. The correction image capture member sends this image data to the correction computation member, which performs computations to determine correction amounts to perform corrections such that differences in brightness between the overlapping part and non-overlapping part are not seen, and sends the correction amount data to the correction processing member. The correction processing member applies brightness correction processing to the image signal based on the received correction amount data. As a result, the difference in brightness appearing in the overlapping part can be eliminated. By means of the above method, a large-screen, high-resolution two-dimensional image can be displayed using the same one-dimensional display devices as used in FIG. 4.

In the eighth aspect also, a single image can be displayed by projecting, onto the above screen, a plurality of images by combining a plurality of the above columnar display units, perpendicular deflection means, and image-forming optical systems. The areas mutually adjacent to the plurality of images projected onto the above screen overlap; but through brightness correction processing, the overlapping parts can be corrected to display a large-screen image with no seams. Because this is a so-called three-panel method in the R, G, B colors, images of even higher resolution than in the seventh aspect can be displayed.

Ninth Aspect of the Invention

Figure 16:
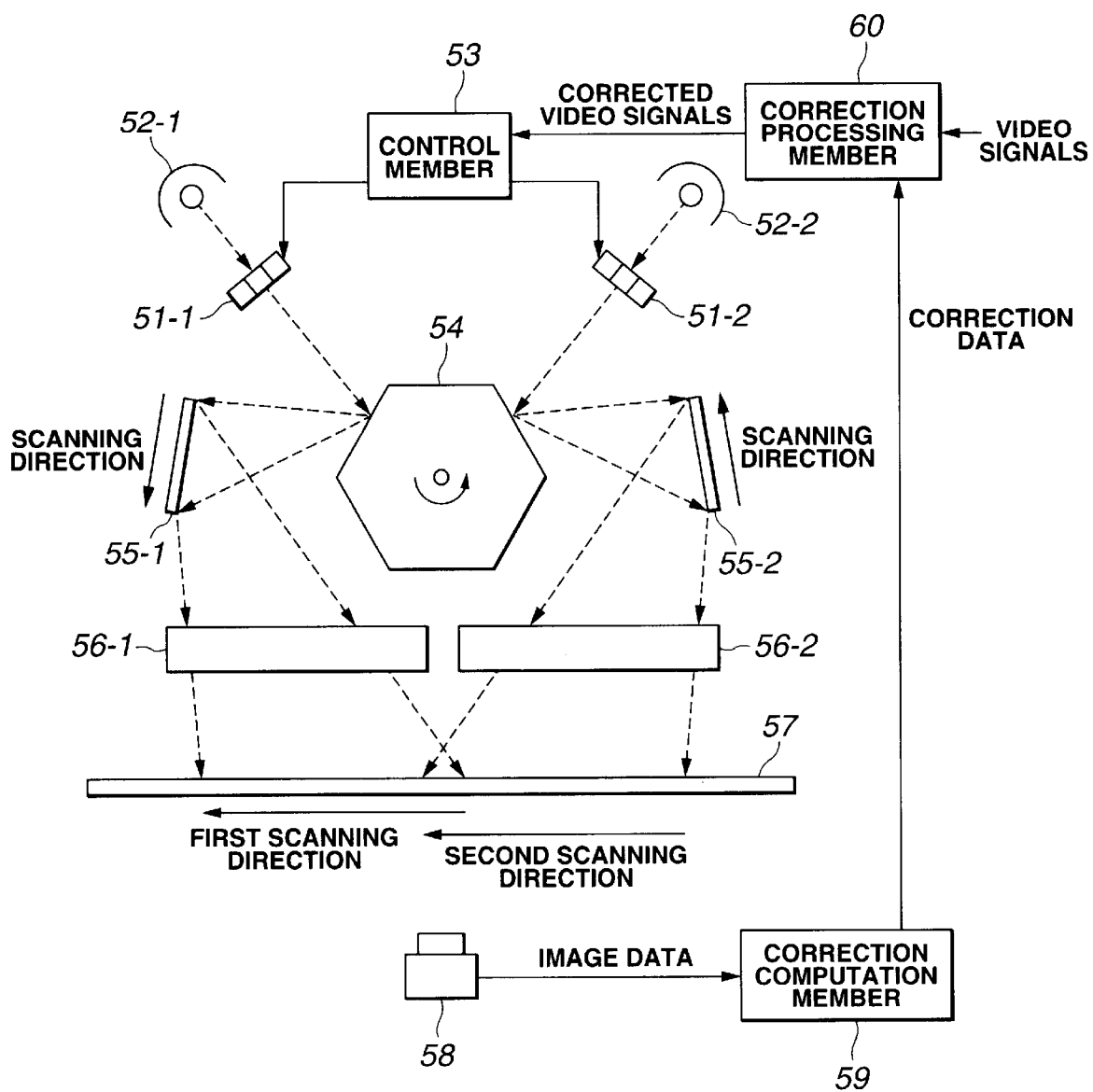
FIG. 16 is a diagram showing in summary the configuration of the image display device of a ninth aspect of this invention, seen from above.

FIG. 16 shows in summary the configuration of the image display device of a ninth aspect of this invention, seen from above. The image display device comprises a plurality (in the figure, two) of columnar display units 51-1, 51-2, in which a plurality of one-dimensional optical modulation means are combined as one columnar display unit; at least one light source 52-1, 52-2; a control member 53; one perpendicular deflection means 54; a plurality of mirrors 55-1, 55-2; a plurality of image-forming optical systems 56-1, 56-2; a screen 57; a correction image capture member 58, which is image capture means for use in correction; a correction computation member 59, which is correction computation means; and correction processing member 60, which is correction processing means.

The plurality of columnar display units 51-1, 51-2 are a plurality of columnar display units in which a plurality (in the figure, three) of one-dimensional optical modulation means, corresponding to a plurality of colors (in the figure, R, G, B) form one set. The one-dimensional optical modulation means is similar to that in FIG. 1. For example, a transmissive liquid crystal element or similar is used as a one-dimensional display device.

The light sources 52-1, 52-2 are white light sources containing the three primary color components, and irradiate the plurality of columnar display units 51-1, 51-2.

Corrected video signals from the correction processing member 60, described below, are input to the control member 53, which applies image signals appropriate to the plurality of columnar display units 51-1, 51-2.

The single perpendicular deflection means 54 comprises a polygon mirror (rotating multi-faced mirror), the shape of the outer periphery of which is, for example, a regular hexagon. Light leaving the plurality of columnar display units 51-1, 51-2 is deflected in directions perpendicular to the respective column directions.

The plurality of mirrors 55-1, 55-2 reflects the plurality of image light beams, deflected by the faces of the single perpendicular deflection means 54, once before reaching the screen, arranging the beams (positioned adjacently) to scan the screen.

The plurality of image-forming optical systems 56-1, 56-2 comprise a combination of a plurality of optical lenses, and produce an image on the screen which is free of defocusing even when the distance from the plurality of columnar display units 51-1, 51-2 to the screen changes.

On the screen 57, the two images displayed on the plurality of columnar display units 51-1, 51-2 are formed in a line, with only the adjacent area overlapping.

The correction image capture member 58 comprises, for example, a digital camera, is positioned in front of the screen 57, and captures the image displayed on the screen 57.

The correction computation member 59 detects changes in brightness in areas of the image from the image data captured by the correction image capture member 58, and based on the detection results computes brightness correction amounts for overlapping parts.

Analog video signals are input to the correction processing member 60, which applies brightness correction to video signals based on correction amounts from the correction computation member 59, and supplies the result to the control member 53.

In the above configuration, the number of columnar display units comprising a plurality of one-dimensional optical modulation means, and the number of mirrors, must be the same. That is, a plurality of sets of one columnar display unit and one mirror is necessary. Light sources may be provided in the same number as the above sets, or one light source may be divided. A configuration may also be employed in which, instead of transmissive one-dimensional display devices, one-dimensional emissive arrays of LEDs, lasers, or other devices are used.

Next, the action of FIG. 16 is explained.

In the aspect of FIG. 16, a two-dimensional image is displayed sequentially several lines at a time, equal to the number of one-dimensional display devices of each of the plurality of columnar display units 51-1, 51-2, and several lines' worth of a modulated image light beam are emitted. The plurality of several lines' worth of emitted image light beams are incident on different positions of the same perpendicular deflection means 54. A image light beam incident on different positions of the perpendicular deflection means 54 is deflected by the perpendicular deflection means 54 in a direction perpendicular to the longitudinal direction of the columnar display units, passes through an image-forming optical system 56-1, 56-2, is corrected for defocusing caused by changes in the projection distance, and several lines' worth of an image are formed at a plurality of positions on the screen 57. The two-dimensional image displayed by the combination of the columnar display units 51-1, 51-2 and the perpendicular deflection means 54 has an overlapping part. Through high-speed execution of rewriting of the columnar display units and high-speed deflection by the perpendicular deflection means, a two-dimensional image can be displayed. The correction image capture member 58 captures the image displayed on the screen with this overlapping part, and obtains image data. The correction image capture member 58 sends this image data to the correction computation member 59; the correction computation member 59 computes correction amounts to perform correction such that differences in brightness between overlapping parts and non-overlapping parts cannot be seen, and sends this correction amount data to the correction processing member 60. The correction processing member 60 applies brightness correction processing to image signals based on the received correction amount data. As a result, differences in brightness occurring in the overlapping part are eliminated. By means of the above method, through this aspect of the invention, only a single perpendicular deflection means is necessary, so that only a single driving source to drive this means is needed; consequently power consumption can be reduced, and the number of parts can be decreased, enabling smaller equipment size. The configuration can be simplified, while retaining the same functions as in FIG. 10.

Figure 17:
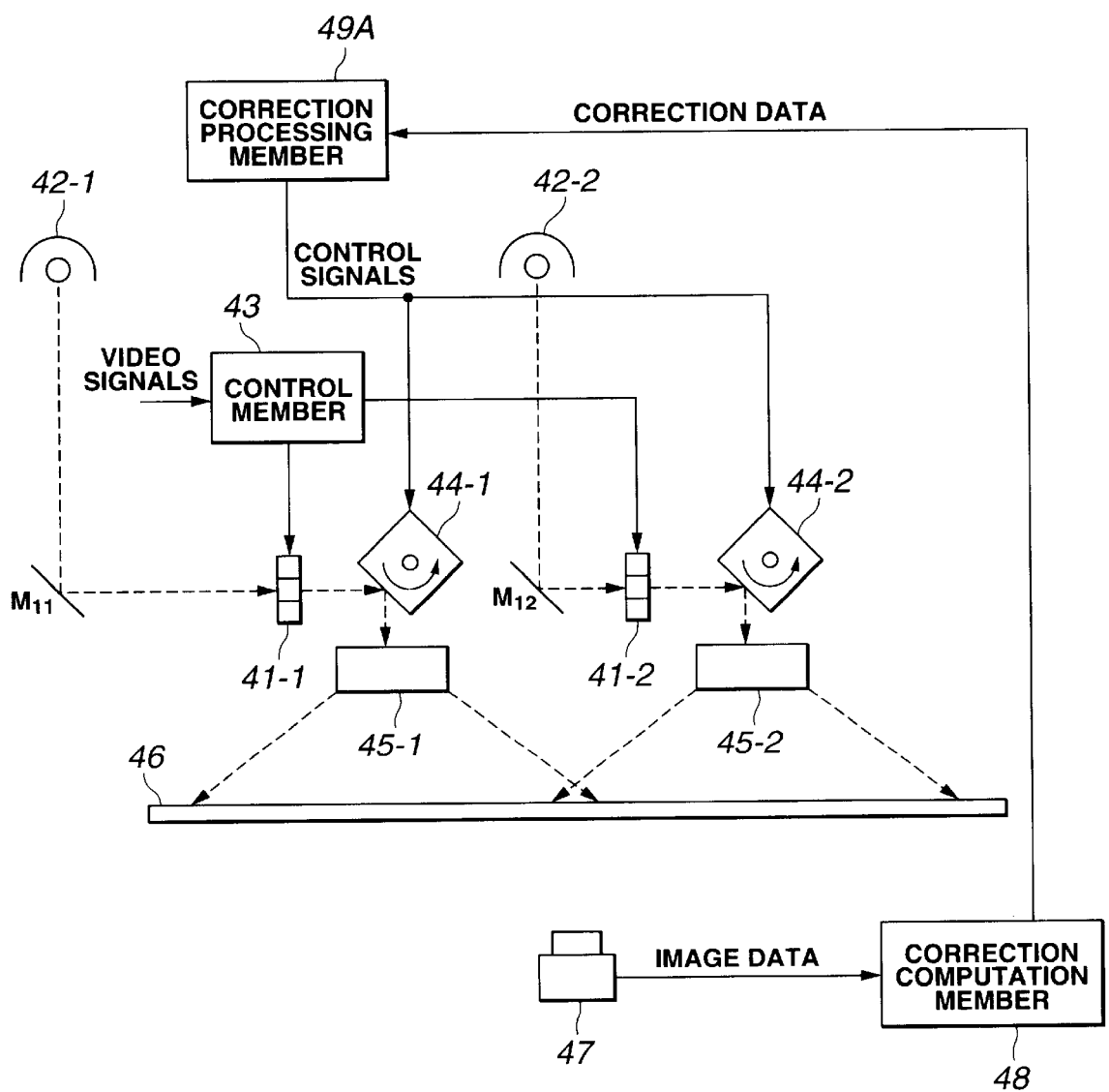
FIG. 17 is a diagram showing in summary the configuration of the image display device of a tenth aspect of this invention, seen from above.
Figure 18:
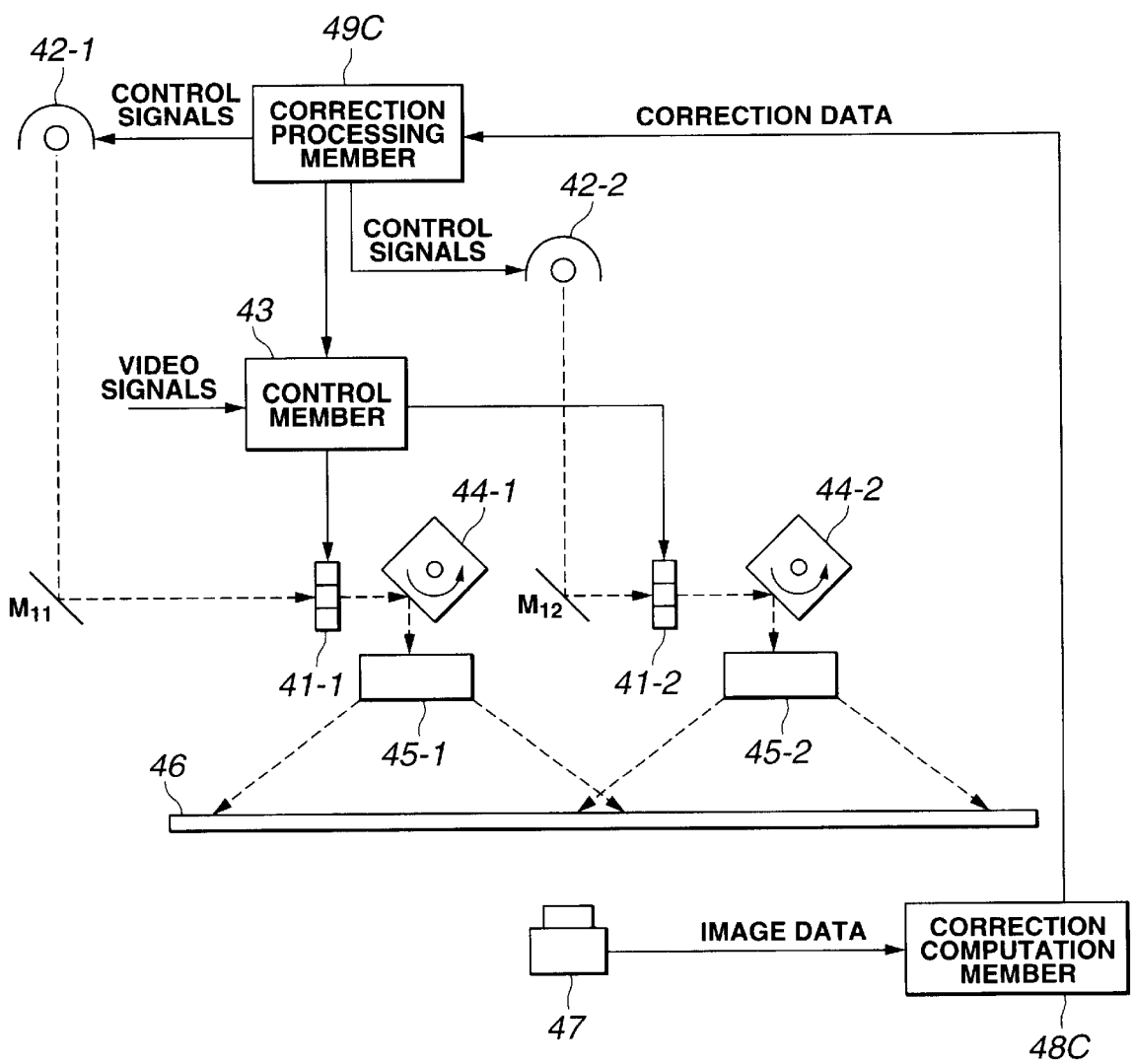
FIG. 18 is a diagram showing in summary the configuration of the image display device of an eleventh aspect of this invention, seen from above.

Next, FIG. 17 and FIG. 18 are used to explain an aspect of the invention in which a method is used to eliminate brightness differences in overlapping parts and non-overlapping parts within the display area, for the case of juxtaposed display on a screen of two images as described in the aspect of FIG. 10.

Tenth Aspect of the Invention

FIG. 17 shows in summary the configuration of the image display device of a tenth aspect of this invention, seen from above. Members which are the same as in FIG. 10 are assigned the same symbols.

In FIG. 17, the correction image capture member 47 captures the image on the screen 46 with an overlapping part and obtains image data. A difference with FIG. 10 is the fact that the correction computation member 48 creates deflection speed correction data based on the brightness difference between overlapping parts and non-overlapping parts in the display area of the image data from the correction image capture member 47, and supplies this data to the correction processing member 49A, which is correction processing means. The deflection speed correction data is data to perform correction such that, if brightness is high as in an overlapping part on the screen 46, the deflection speed (rotation rate) is increased such that the brightness of this part approaches the average brightness value (reference value) of non-overlapping parts, and such that, in parts with average brightness value such as non-overlapping parts, the deflection speed is either reduced or is held at a fixed value. In the correction processing member 49A, control signals are generated to control each of the deflection speeds of the perpendicular deflection means 44-1, 44-2 based on the deflection speed correction data, and these signals are supplied to the respective perpendicular deflection means 44-1, 44-2. By this means, each of the perpendicular deflection means 44-1, 44-2 is controlled such that if the display brightness on the screen 46 is high, the perpendicular deflection speed is increased, and if the display brightness is low, the perpendicular deflection speed is either decreased or held constant. That is, by changing the deflection speeds of the perpendicular deflection means 44-1, 44-2 according to the display position based on correction amounts computed by the correction computation member 48, brightness differences within the display area can be eliminated.

Next, the action of FIG. 17 is explained.

In the aspect of FIG. 17, compared with the method for correcting the brightness of overlapping high-brightness parts by lowering the amplitude level of the video signal (see FIG. 11A), there is the advantage that brightness correction can be performed without lowering the amplitude levels of the video signals (that is, without detracting from the dynamic range of the display elements) producing display in the one-dimensional display elements comprised by the columnar display units 41-1, 41-2. That is, the amplitude levels of video signals in the overlapping parts are not lowered, so that even if the brightness in these parts is reduced by velocity modulation, there is no loss of density information in the image, and so brightness correction can be performed without image degradation.

While performing brightness correction for overlapping parts within the display area (stripe-like parts in the vertical direction) by raising the deflection speed (rotation rate) of the perpendicular deflection means, brightness unevenness existing in the direction perpendicular to this (that is, the horizontal direction) may be eliminated using the one-dimensional optical modulation devices, by controlling the image signal level. At this time, correction for geometric distortion and other phenomena may also be performed by controlling the video signal.

Eleventh Aspect of the Invention

FIG. 18 shows in summary the configuration of the image display device of an eleventh aspect of this invention, seen from above. Members which are the same as in FIG. 10 are assigned the same symbols.

In FIG. 18, the correction image capture member 47 captures the image on the screen 46 with an overlapping part and obtains image data. A difference with FIG. 10 is the fact that the correction computation member 48C creates dimming correction data based on brightness differences between overlapping parts and non-overlapping parts in the display area of the image data from the correction image capture member 47, and supplies this data to the correction processing member 49C, which is correction processing means. The dimming correction data is data to perform corrections such that, when the brightness of an overlapping part on the screen 46 is high, the optical output is lowered such that the brightness of this part approaches the average brightness value (reference value) of non-overlapping parts, and such that, for parts with average brightness as in non-overlapping parts, the optical output is either raised, or held constant. The correction processing member 49C generates control signals to control each of the optical outputs of the light sources 42-1, 42-2 based on this dimming correction data, and supplies these signals to the respective light sources 42-1, 42-2. By this means, each of the light sources 42-1, 42-2 is controlled so as to lower the optical output if the display brightness on the screen 46 is high, and to raise or hold constant the optical output if the display brightness is low. That is, by using the light sources 42-1, 42-2 to modulate the brightness (that is, change the light output) according to the timing of perpendicular deflection to the display position based on correction amounts computed by the correction computation member 48C, brightness differences within the display area can be eliminated.

Next, the action of FIG. 18 is explained.

In the aspect of FIG. 18, compared with the method for correcting the brightness of overlapping high-brightness parts by lowering the amplitude level of the video signal (see FIG. 11A), there is the advantage that brightness correction can be performed without lowering the amplitude levels of the video signals (that is, without detracting from the dynamic range of the display elements) producing display in the one-dimensional display elements comprised by the columnar display units 41-1, 41-2. That is, the amplitude levels of video signals in the overlapping parts are not lowered, so that even if the brightness in these parts is reduced by light source modulation, there is no loss of density information in the image, and so brightness correction can be performed without image degradation.

While performing brightness correction for overlapping parts within the display area (stripe-like parts in the vertical direction) by lowering the optical output of light sources, brightness unevenness existing in the direction perpendicular to this (that is, the horizontal direction) may be eliminated using the one-dimensional optical modulation devices, by controlling the image signal level. At this time, correction for geometric distortion and other phenomena may also be performed by controlling the video signal.

In the above-described aspects, a combination of a plurality of optical lenses is used as image-forming optical systems to produce an image free of defocusing on a screen. However, there are drawbacks, such as the high cost of a system to produce an image completely free of defocusing by this image formation method, and the need to fix optical lenses in positions, with attendant loss of freedom to employ various configurations. Hence an aspect is next explained in which the image-forming optical system is configured using a method employed in microscopes (a focus-adjustment method using a movable mirror or similar).

Twelfth Aspect of the Invention

Figure 19:
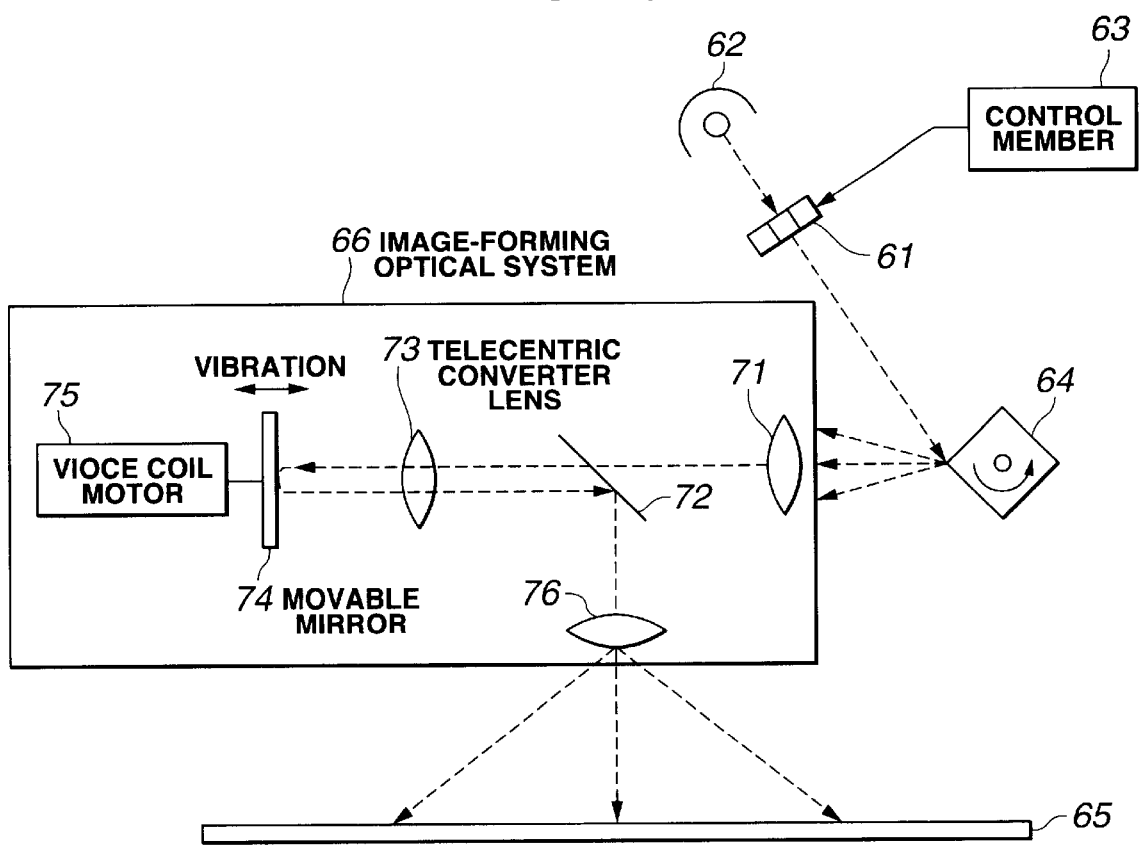
FIG. 19 is a diagram showing in summary the configuration of the image display device of a twelfth aspect of this invention, seen from above; and, FIG. 20 is a diagram showing the configuration of one-dimensional optical modulation means in the image display device of a thirteenth aspect of this invention.

FIG. 19 shows in summary the configuration of the image display device of a twelfth aspect of this invention, seen from above.

In FIG. 19, a difference with the aspects of FIGS. 1 through 18 is the use of a focus-adjustment method by means of a movable mirror as the image-forming optical system 66. That is, the image display device has a columnar display unit 61; a light source 62; a control member 63; perpendicular deflection means 64; a screen 65; and an image-forming optical system 66. The image-forming optical system 66 has image-forming lenses 71, 76; a half-mirror 72; a telecentric converter lens 73; a movable mirror 74; and a voice-coil motor 75.

The columnar display unit 61 comprises a plurality of one-dimensional optical modulation means, corresponding to a plurality of colors, arranged in parallel (see FIG. 2A through FIG. 2C).

As the light source 62, a white light source containing the three primary color (R, G, B) components is used to irradiate the columnar display unit, comprising transmissive display elements.

The control member 63 supplies to the columnar display unit 61 video signals appropriate to the columnar display unit 61.

As the perpendicular deflection means 64, a polygon mirror, galvano-mirror or other rotary-driven deflection means is used to deflect and scan light modulated by the columnar display unit 61 in directions perpendicular to the column direction.

The screen 65 is used to form the image displayed on the columnar display unit 61.

The image-forming optical system 66, part of which is movable in order to adjust the focus position according to the display position of the image light beam projected onto the screen 65 (that is, according to the deflection angle of the perpendicular deflection means 64), produces an image on the screen, free of defocusing.

Next, the action of FIG. 19 is explained.

In the aspect of FIG. 19, the distance from the columnar display unit 61 to the screen 65 changes with the deflection angle of the perpendicular deflection means 64. By moving the mirror 74 or other optical components of the image-forming optical system 66 according to the distance from the columnar display unit 61 to the screen 65, the focus position of the one-dimensional image deflected by the perpendicular deflection means 64 is changed, and focus is maintained on any part of the screen 65. By this means, all parts of the image can be focused on the screen 65.

To explain the action in greater detail, the image light beam reflected by the perpendicular deflection means 64 passes through the image-forming lens 71 and half-mirror 72, and forms a an image on the intermediate image plane created by the telecentric converter lens 73. By positioning the movable mirror 74 at this intermediate image plane and moving (vibrating) it back and forth in the depth direction, the focus position can be adjusted (that is, the position of the focal point can be adjusted). The movable mirror 74 can be moved forward and backward according to the deflection angle of the perpendicular deflection means 64 (according to the display position of the projected image light beam on the screen 65) by a voice coil motor (VCM) 75. Light reflected by the movable mirror 74 passes through the telecentric converter lens 73, is reflected by the half-mirror 72, passes through the image-forming lens 76, and forms an image on the screen 65. An image can be displayed on the screen 65 even when the distance from the columnar display unit 61 to the screen 65 changes.

In the aspect of FIG. 19, as explained with respect to the aspect of FIG. 10, a plurality of columnar display units, a plurality of perpendicular deflection means, and a plurality of image-forming optical systems may be combined to display a plurality of images in a row on a screen. Moreover, a plurality of images may be displayed with adjacent parts overlapping, and correction image capture means, correction computation means, and correction processing means used to correct for brightness or other phenomena in overlapping parts.

In the above-described aspects, configurations have been explained which use, as at least one of the one-dimensional optical modulation means comprised by columnar display units, transmissive liquid crystal display elements, or one-dimensional emissive arrays such as of LEDs or lasers. However, a configuration which employs reflective elements as one-dimensional optical modulation means is also possible.

Thirteenth Aspect of the Invention

Figure 20:
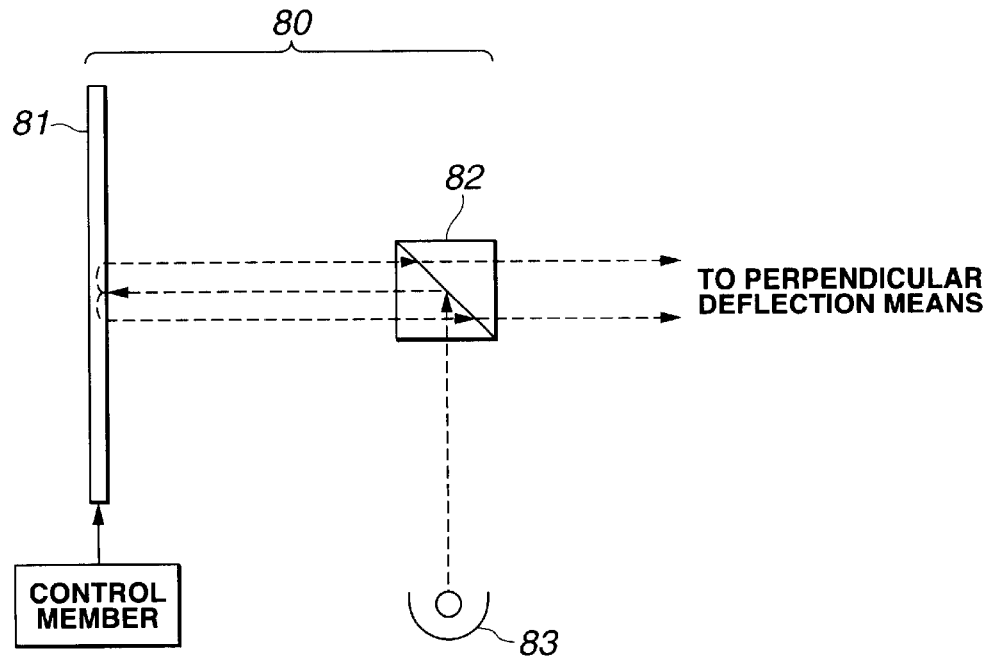

FIG. 20 shows the configuration of one-dimensional optical modulation means in the image display device of a thirteenth aspect of this invention.

In FIG. 20, the columnar display unit 80 comprises reflection-type one-dimensional optical modulation means 81; light from the light source 83 is reflected by a PBS or other optical combination means 82, is incident on the reflection-type one-dimensional optical modulation means 81, and reflected light which has been modulated by the display image passes through the above optical combination means 82 and is guided to a perpendicular deflection means, not shown.

As the one-dimensional optical modulation means 81, a reflection-type element such as the "grating light valve" developed by Silicon Light Machines, and an optical element to guide light from the light source to this element, may be used.

As the perpendicular deflection means in this invention, a polygon mirror (rotating multi-faced mirror), galvanometer-scanner (plane mirror), or other means capable of rapid, stable scanning may be used. The polygon mirror may have any number of faces. The scanning velocity need not be constant. Some distortion occurs in the peripheral parts of an image, and this can be corrected by changing the velocity. The scanning direction may be from top to bottom on the screen, from bottom to top, from right to left, from left to right, or from right to left and then left to right.

By means of the aspects of this invention described above, flicker-free, high-resolution, large-screen images can be displayed. Moreover, devices with slow rewrite speeds can be used as the one-dimensional optical modulation means which serve as display devices.

This invention is not limited to the aspects described above, and various modifications may be made so long as the gist of the invention is retained.

What is claimed is:

1. An image display device for displaying images on a screen, comprising:

a columnar display unit, comprising a plurality of means, arranged in parallel, which emit one-dimensional images;

a control member which applies image signals to said columnar display unit;

a perpendicular deflection means, which deflects light emitted from said columnar display unit in directions perpendicular to the column direction, and scans said screen;

an image-forming optical system which forms an image, from said perpendicular deflection means, on said screen, according to the change in the distance from said columnar display unit to said screen;

a light source, comprising a plurality of color components, and which irradiates said columnar display unit;

a color separation means which separates light emitted from said light source into each color component, for incidence on each respective columnar display subunit corresponding to each color component; and optical combination means which combines light, of a plurality of colors and passed through the columnar display subunit corresponding to each color component, such that there are no shifts in position of each color component, for incidence on said perpendicular deflection means;

wherein said columnar display unit modulates irradiated light, and wherein said columnar display unit modulates irradiated light, and wherein said plurality of means, which emits one-dimensional images, is a transmissive liquid crystal display element.

2. The image display device according to claim 1, wherein:

said columnar display unit comprises columnar display subunits, each comprising a plurality of means, arranged in parallel, which emit one-dimensional images, there being a subunit for each color and there being a number of subunits to represent a plurality of colors; and said control member applies image signals appropriate to said columnar display subunit for each individual color.

3. The image display device according to claim 2, wherein;

said columnar display subunit comprises a plurality of one-dimensional emissive arrays, arranged in parallel.

4. The image display device according to claim 1, wherein:

said columnar display unit modulates irradiated light, and said image display device further comprises a light source which irradiates said columnar display unit.

5. The image display device according to claim 1, wherein:

said columnar display unit comprises a plurality of one-dimensional emissive arrays, which correspond to a plurality of colors, arranged in parallel.

6. The image display device according to claim 1, wherein:

one part of said image-forming optical system is movable in order to adjust the focal point according to the deflection angle of said perpendicular deflection means.

7. The image display device according to claim 6, wherein:

said image-forming optical system has a telecentric converter lens and movable mirror, the movable mirror being positioned at an intermediate image plane and movable in the depth direction.

8. The image display device according to claim 1, wherein:

said means, which emits one-dimensional images, has a reflection-type element and an optical element to guide irradiated light to this reflection-type element from the light source.

9. An image display device for displaying images on a screen, comprising:

a plurality of columnar display units, in which a plurality of means, which emit one-dimensional color images, are arranged in parallel to form one columnar display unit;

a control member which applies image signals to each of said columnar display units;

at least one perpendicular deflection means which deflects light emitted from each of said columnar display units in directions perpendicular to the column direction, and which scans said screen; and a plurality of image-forming optical systems which form an image, from said perpendicular deflection means, on said screen, according to the change in the distance from each of said columnar display units to said screen.

10. The image display device according to claim 9, wherein:

said columnar display unit comprises columnar display subunits, each comprising a plurality of means, arranged in parallel, which emit one-dimensional images, there being a subunit for each color and there being a number of subunits to represent a plurality of colors; and said control member applies image signals appropriate to each of said columnar display subunits for each color.

11. The image display device according to claim 10, wherein:

said columnar display modulates irradiated light, and said image display device further comprises:

a light source, comprising a plurality of color components, and which irradiates said columnar display unit;

a color separation means which separates light emitted from said light source into each color component, for incidence on each respective columnar display subunit corresponding to each color component; and optical combination means which combines light, of a plurality of colors and passed through the columnar display subunit corresponding to each color component, for incidence on said perpendicular deflection means.

12. The image display device according to claim 9, further comprising:

correction image capture means, which captures the image displayed on said screen;

correction computation means, which computes correction amounts from image data captured by said correction image capture means; and correction processing means, which performs correction of image signals based on correction amounts from said correction computation means.

13. The image display device according to claim 12 wherein:

a plurality of images are projected on said screen to display a single image.

14. The image display device according to claim 13, wherein:

the plurality of images projected on said screen overlap in the areas that are mutually adjacent.

15. The image display device according to claim 12, further comprising:

a mirror, provided between said perpendicular deflection means and said screen, and which reflects light, deflected by said perpendicular deflection means, once before the light reaches the screen, to scan the screen.

16. The image display device according to further comprising:

means for changing the reflection velocity of said perpendicular deflection means according to the display position, based on said computed correction amounts.

17. The image display device according to claim 12, further comprising:

means for performing modulation of brightness of said light source according to the timing of the display position deflection, based on said computed correction amounts.

18. The image display device according to claim 9, wherein:

said means, which emits one-dimensional images, has a reflection-type element and an optical element to guide irradiated light to this reflection-type element from the light source.

19. The image display device according to claim 9, wherein:

said means, which emits one-dimensional images, is a transmissive liquid crystal display element.

* * * * *